United States Patent
Lu et al.

(10) Patent No.: US 7,860,236 B2
(45) Date of Patent: Dec. 28, 2010

(54) METHOD AND SYSTEM FOR ECHO CANCELLATION IN A NETWORK SWITCH

(75) Inventors: Youhong Lu, Vernon Hills, IL (US); Glenn Kosteva, Westford, MA (US); Jenny Jianqiu Jin, Natick, MA (US); Nick Georgacopoulos, Lowell, MA (US)

(73) Assignee: Hewlet-Packard Company, Palo Alto, CA (US)

( * ) Notice: Subject to any disclaimer, the term of this patent is extended or adjusted under 35 U.S.C. 154(b) by 684 days.

(21) Appl. No.: 11/670,316

(22) Filed: Feb. 1, 2007

(65) Prior Publication Data
US 2008/0187129 A1 Aug. 7, 2008

(51) Int. Cl.
*H04M 9/08* (2006.01)
(52) U.S. Cl. .............. 379/406.06; 379/406.08; 379/406.1
(58) Field of Classification Search ........... 379/406.02–406.16; 370/286–290
See application file for complete search history.

(56) References Cited

U.S. PATENT DOCUMENTS

| | | | |
|---|---|---|---|
| 4,845,746 A | 7/1989 | Li | |
| 5,050,160 A * | 9/1991 | Fuda | 370/292 |
| 5,099,472 A | 3/1992 | Townsend | |
| 5,737,408 A | 4/1998 | Hasegawa | |
| 5,999,828 A | 12/1999 | Sih et al. | |
| 6,052,462 A * | 4/2000 | Lu | 379/406.08 |
| 6,507,652 B1 * | 1/2003 | Laberteaux | 379/406.05 |
| 6,526,026 B1 * | 2/2003 | Menon | 370/310 |
| 6,580,696 B1 * | 6/2003 | Chen et al. | 370/286 |
| 7,003,098 B2 | 2/2006 | Smith | |
| 7,068,780 B1 * | 6/2006 | Levonas et al. | 379/406.08 |
| 2004/0114752 A1 * | 6/2004 | Rude et al. | 379/406.01 |
| 2004/0228473 A1 * | 11/2004 | Smith | 379/406.01 |
| 2005/0013430 A1 * | 1/2005 | Houghton | 379/391 |
| 2005/0124326 A1 * | 6/2005 | Belkin et al. | 455/414.1 |
| 2005/0180559 A1 * | 8/2005 | Pisoni et al. | 379/406.12 |

* cited by examiner

*Primary Examiner*—Fan Tsang
*Assistant Examiner*—Assad Mohammed

(57) ABSTRACT

A method and system in network switch for cancelling multiple sources of network echo, including echo that is combined with a persistent, non-echo signal. A first echo canceller cancels a first echo signal that arises from an echo path in the network switch, and second echo canceller cancels a second echo signal that arises from an echo path in an external network device. The first echo canceller operates by first removing any persistent, non-echo signal that may be combined with the first echo signal, then training on the remaining, pure echo signal. The second echo canceller includes two sub-component echo cancellers that are coordinated so as to provide a minimum error signal for cancellation applied to the second echo signal.

15 Claims, 15 Drawing Sheets

METHOD AND SYSTEM FOR ECHO CANCELLATION IN A NETWORK SWITCH

FIELD OF THE INVENTION

The present invention relates to echo cancellation in communication networks. In particular, the present invention is directed to a method and system of multiple echo cancellers in a network switch.

BACKGROUND

Communication networks provide communicative connections between two or more devices, enabling the devices to exchange information with each other. Information, referred to generically as "data," may include streaming media data, such as voice or video, and packet data, such as email and text files, to name just a few examples. Communication networks may employ various means to transport data between communicating devices. For example, in the public switched telephone network (PSTN) voice data are typically transported as digitized samples of input from a telephone or similar device, each sample being transmitted as it is generated. As another example, in a packet network, such as Internet Protocol (IP) network (e.g., the Internet), data are assembled into packets that are then transmitted between communicating devices. As a further example, voice data may be transmitted in a packet network as voice over IP (VoIP), wherein sequential groupings of digital samples are transported in IP packets. Other forms of transport are known as well.

The communication path between any two or more devices generally includes one or more logical links and one or more physical links. Logical links may identify endpoints of a connection, for example, and may be established or supported over one or more underlying physical links. For instance, a logical link could comprise a communication path between two computers wherein the path is defined according to endpoints that are specified by symbolic addresses of the computers. The logical link could, in turn, be established over physical connections between two or more network routers or switches. Other arrangements are possible as well.

Physical links correspond to the actual physical connections over which physical signals are transmitted, the physical signals carrying the information that comprise the communicated data. For instance, an analog phone and a PSTN central office (CO) switch may be physically connected by a two-wire loop circuit, in which case information is carried in signals comprising analog electrical signals. As another example, two PSTN switches may be physically connected by an optical link, in which case the signals may comprise digital data transported as optical signals. A further example is the physical connection between two network routers or switches, as mentioned above. These are just a few examples of physical links, and others are possible.

A device that acts to communicatively connect two or more physical links in a network is referred to generally as a network switch. That is, a network switch translates the physical signals input on one link to the output transmitted on another link, in addition to other functions that may be carried out, including determining the output link(s) to which a particular input should be translated. Exemplary network switches include PSTN switches, Ethernet switches, and asynchronous transfer mode (ATM) switches, among others.

In a switch that translates between two or more different types of physical links, the physical translation of an input signal to an output link may give rise to a partial reflection of the input signal back toward the source of that signal, in addition to the intended transmission of the signal on the output link. For example, the circuitry that performs the translation may suffer an impedance mismatch between the different types of links. Such reflected or leaked signal is referred to as echo because the source of the input signal receives a distorted version of the signal echoed back from the switch, the echoed signal being delayed by the round-trip transmission time between the source and the switch. The echoed signal may then combine with any signal transmissions intend for the source, thereby distorting or polluting those transmissions. The portion of the translation path in the switch on which echo is generated is called the echo path.

Echo may be most familiarly encountered in voice telephone calls in circuit-switched networks because of the common use in circuit telephony switches of a two-to-four wire device known as a hybrid that can be a source of echo. And also because when echo is present in a voice call, it is generally obvious and annoying to the party that hears it. However, other communications carried in circuit-switched networks, such as fax transmissions and computer modem transmission, may also be subject to echo. Moreover, echo in communication networks may arise in any network switch in which the characteristics of the physical translation between different physical types of input and output signals cause reflection or leakage. Consequently, echo may affect communications in other types of networks besides circuit-switch telephony networks, for instance. In any type of network, the impact of echo on the effected communications may range from annoying to debilitating.

SUMMARY

Under certain circumstances, it may be possible to reduce echo in a communication network by introducing in the signal path that contains unwanted echo a functional element that reduces or eliminates the echo signal. Such an element, referred to as an echo canceller, generally acts to create a reproduction of the echo signal and then subtract it from the polluted signal. An echo canceller may be viewed as being situated downstream from the echoing switch element, and operates by redirecting to an adaptive filter a portion of the same source signal that is sent upstream to where the echo path is located. The filter output is continuously subtracted from the received signal containing the echo signal while the resulting difference signal is fed back to the filter. The filter is adjusted according to the feedback signal until a minimum difference signal is achieved. In other words, the filter is adjusted so that its output matches the echo signal, and the difference signal, or error signal, is minimized. The process of adjusting the filter (or the echo canceller) is generally referred to as training.

Difficulties with echo cancellation may arise when the echo signal is mixed with persistent, intended transmissions from the upstream direction. When this occurs, the filter is unable to train on the pure echo signal and improper echo cancellation results. Additionally, a communication network may include multiple sources of echo; i.e., multiple upstream switches or switch devices in which echo may arise. Thus, a source may receive multiple, combined echo signals, each with different characteristics. Again, echo cancellation may not be possible since one filter may not be able to reproduce the properties of multiple echo paths. Consequently, there is need for echo cancellation that can address both persistent transmissions mixed in with the echo signal, and multiple sources of echo.

Accordingly, the present invention is directed to a method and system for echo cancellation that addresses both multiple echo sources in a network, and echo signal combined with persistent non-echo signal. More particularly, a method and system is disclosed for incorporating multiple echo cancellers in a network switch in such a manner that the combined operation of each echo canceller cancels echo from each of multiple echo sources in the switch and in the network, while also including method and system elements that cancel echo signal that is mixed with certain types of persistent, non-echo signal. The preferred embodiments discussed herein apply to exemplary instances of two echo sources, one in the network, and the other in the network switch in which the invention is enabled. However, the system and method can be extended to more than two echo sources and a corresponding number of echo cancellers in the network switch.

Hence, in one respect, the invention is directed to a method of cancelling echo in a network switch that includes a first and a second echo canceller in the network switch for cancelling a first and a second echo source, respectively, wherein the echo path of the first echo source ("first echo path") is located in the network switch itself and the echo path of the second echo source ("second echo path") is located externally to the network switch, for instance in a network device that is situated in an external network and that is communicatively connected to the network switch. In an exemplary embodiment, the network switch could be a foreign exchange office (FXO) switch or an FXO line card in VoIP gateway, and the connection between the FXO and the network device could be made via an intervening local switch. The network device could be a remote switch, such as a PSTN switch or a private branch exchange (PBX) switch, and the local switch could be a CO switch that provides PSTN access to the network switch. Further, either or both echo sources could be two-to-four wire hybrid switches. The system and method applies to other types of switches, devices, and echo sources as well.

In exemplary operation, when a connection between the network switch and the local switch becomes active, the local switch may transmit a persistent connection-status signal, such as dial tone, to the network switch. Activation of the connection to the local switch typically causes the echo path in the network switch to be introduced into the signal path, and the connection-status signal may therefore be mixed with echo signal. For instance, when a phone in a network attached to an FXO goes off-hook, an analog loop circuit between the FXO and a CO switch may become active, and the CO switch may responsively play dial tone to the FXO and the attached phone. The dial tone will be combined with any echo signal that arises on the FXO echo path.

In accordance with a preferred embodiment, the first echo canceller may be configured to cancel echo from the first echo path, the configuration involving an initial adjustment of the first echo canceller. More particularly, a connection between the network switch and the local switch may be made active, and the connection-status signal from the local switch may be removed from the signal path. A known test signal, such as white noise, may then be transmitted from the network switch, and its echo from the echo path in the network switch may be cancelled by the first echo canceller. That is, the first echo canceller may be adjusted or trained on a test echo signal (i.e., the echo of the test signal), once the connection-status signal is removed from the combined signal.

In further accordance with the preferred embodiment, removal of the connection-status signal may be accomplished by one or both of two methods. In the first method, a known cessation signal may be transmitted to the local switch that causes the local switch to responsively cease playing the connection-status signal. For instance, the FXO could transmit one or more dual-tone multi-frequency (DTMF) tones to the CO switch that cause the switch to stop playing dial tone (or other signal). In the second method, a removal filter may be used to suppress frequencies in the connection-status signal.

Once the first echo canceller is adjusted, according to the test echo signal, to cancel echo from the first echo path, it is thereafter be operable to cancel any echo signal generated by the first echo path. In particular, the network switch may receive a signal comprising a first echo signal generated by the first echo path and a second echo signal generated by the second echo path. The first echo canceller will preferably cancel the first echo signal. The first echo signal could be echo of voice media data transmitted from a VoIP phone in a network attached to an FXO switch for example, the echo being generated by the first echo path.

The second echo signal could be echo of the same voice media data, the echo being generated by an echo path in an external device. After training on at least a portion of the second echo signal, the second echo canceller may then cancel the second echo signal. For instance, the second echo signal could be from the echo at a far-end PBX switch of voice data transmitted from a phone in a network attached to the FXO. The second echo canceller will preferably train on the echoed voice signal, thereby removing (or at least reducing) it from the return path to the phone.

In a preferred embodiment, the second echo canceller will include two sub-component echo cancellers. During a given current call, the first may initially operate according to adjustments from a previous call, while the second may train according the echo signal of the current call. During any initial call phase of the current call in which only the first echo path is present, the second sub-component echo canceller may operate according to an initial adjustment that yields no echo cancellation, and its error signal may be output by the system. When during the same call the second echo path first becomes present, the second sub-component echo canceller may begin training on the second echo signal, while the first sub-component echo canceller's error signal may be output by the system. Once the second sub-component echo canceller is trained on the second echo signal, its error signal may be output by the system, and its adjustments may be copied to the first sub-component echo canceller. During subsequent operation, the smaller of the two error signals from the two sub-component echo cancellers will be selected for system output.

As a further aspect of the preferred embodiment, both echo cancellers may be digital echo cancellers, operating on digital forms of the transmitted and echoed signals. In this instance, the digital echo cancellers will preferably be implemented in one or more digital signal processors (DSPs) or DSP systems. Further, training or adjustment of each echo canceller will involve adjusting an adaptive digital filter according to a set of coefficients in order to minimize an output error signal. For example, a normalized least mean square (NLMS) algorithm may be used, and minimization may then correspond to convergence of the algorithm. Additionally, the removal filter will also be an adaptive digital filter adjusted according to a set of coefficients.

Still further, both sub-component echo cancellers may also be enabled as digital echo cancellers using DSPs or DSP systems, and training or adjustment of each echo canceller will preferably involve adjusting an adaptive digital filter according to a set of coefficients in order to minimize an output error signal. Again, a NLMS algorithm may be applied.

In another respect, the present invention is directed to a system for implementing in a network switch the methods of echo cancellation described by way exemplary embodiments. The system will preferably be based on one or more DSPs, and will include machine language instructions executable by the DSP-based system to carry out the functions of echo cancellation with multiple echo cancellers.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

Exemplary Network Contexts

Figure 1A:
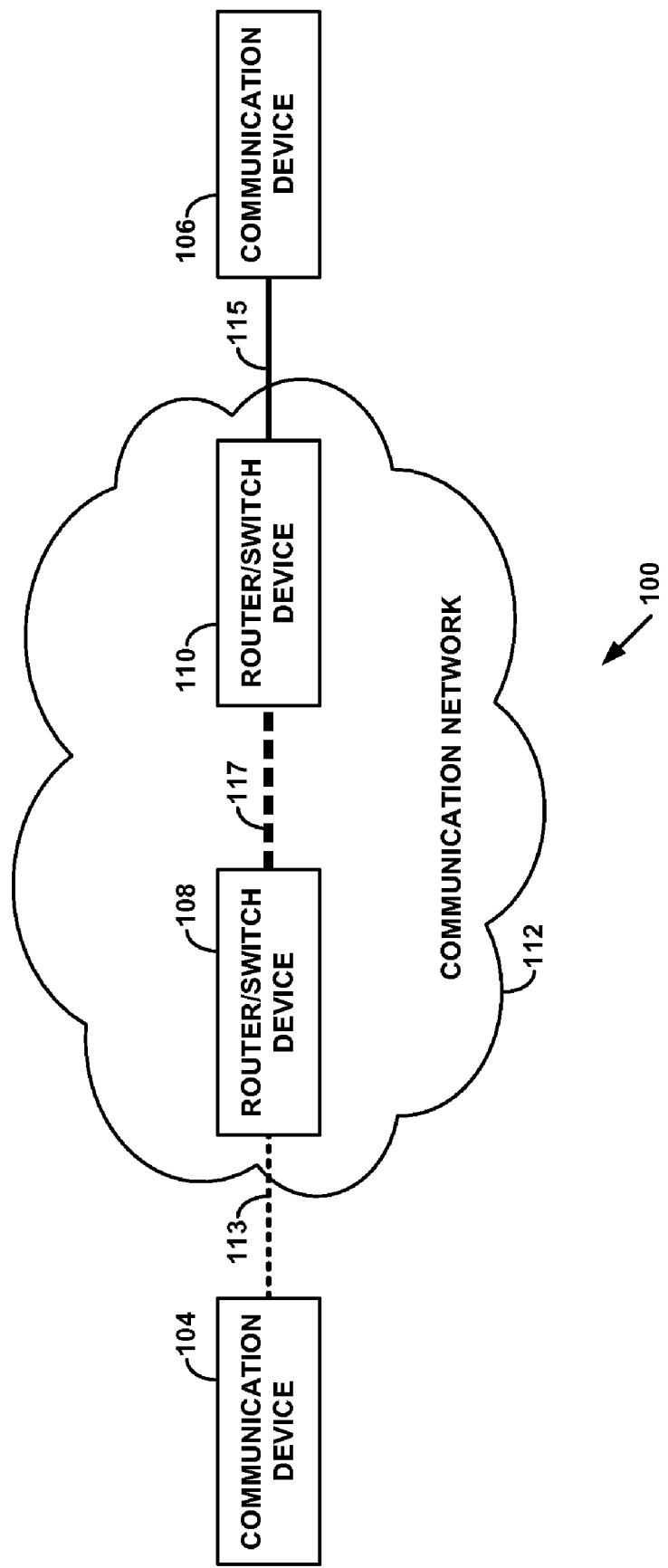
FIGS. 1 (a and b) is a simplified representation of a network in which echo may arise, and in which the method and system of echo cancellation of the present invention may be carried out.

FIG. 1a illustrates a simplified exemplary network 100 in echo may occur, and in which a method and system of echo cancellation in network switch may be carried out. By way of example, network 100 includes two communication devices 104 and 106 communicatively connected by way of communication network 112, which in turn comprises two router/switch devices 108 and 110. Communication devices 104 and 106 represent endpoint devices that are sources and/or destinations of communications. Router/switch devices 108 and 110 represent intermediate devices that transfer input to output according to source and destination, for example.

Exemplary communication network 112 could be a packet network, such as an IP network (e.g., the Internet), a circuit network, such as the PSTN, or a combination of different types of networks interconnected by interworking devices. Communication devices 104 and 106 could be computers, VoIP phones, digital telephones, or analog telephones, for example. Further, communication devices 104 and 106 need not be the same type of device. Each of router/switch devices 108 and 110 could be a packet switch or router, an ATM switch, or a circuit telephony switch, for instance, and each could be a different type of device. It should be understood that these exemplary devices and components illustrate certain aspects of the present invention, and that network 100 could contain additional devices and components as well.

Communication device 104 is connected to router/switch device 108 via link 113, while communication device 106 is connected to router/switch 110 via link 115. Router/switch devices 108 and 110 are in turn connected via link 117. Each of links 113, 115, and 117 represent physical connections between respective devices, and the different lines used for each (thin-dotted, thin-solid, and thick-dashed) indicate that each could be different types of physical connections. For instance, link 113 could be a wireless link between a computer and a wireless access point (e.g., wireless Ethernet), link 115 could be a wired link between a computer an Ethernet switch, and link 117 could be a optical link (e.g., SONET) between switches. Alternatively, link 113 could be a wireless cellular connection, link 115 could be an analog telephone circuit connection, and link 117 could be digital telephony trunk. These examples are not intended to be limiting, and other types of physical connections are possible.

In a switching device such as switch/router device 108 or 110 that transfers input signal on one type of physical link to output signal on another, different type of physical link, the physical transfer between links may give rise to transmission artifacts that can pollute or distort either or both of the input and output physical signals. The occurrence and severity of such distortion may depend, in part, on properties of the circuitry that interconnects to two different physical links, for instance. A particular form of distortion, referred to as echo, occurs when a portion of input signal from a sending device is unintentionally leaked or reflected back toward the sender, in addition to the intentional transmission of the majority of the input signal to the output link. The resulting effect of echo on communications can range from negligible to disruptive or disabling, depending on severity of the echo and the type of communication affected (e.g., voice, fax, packet data, etc.).

Figure 1B:
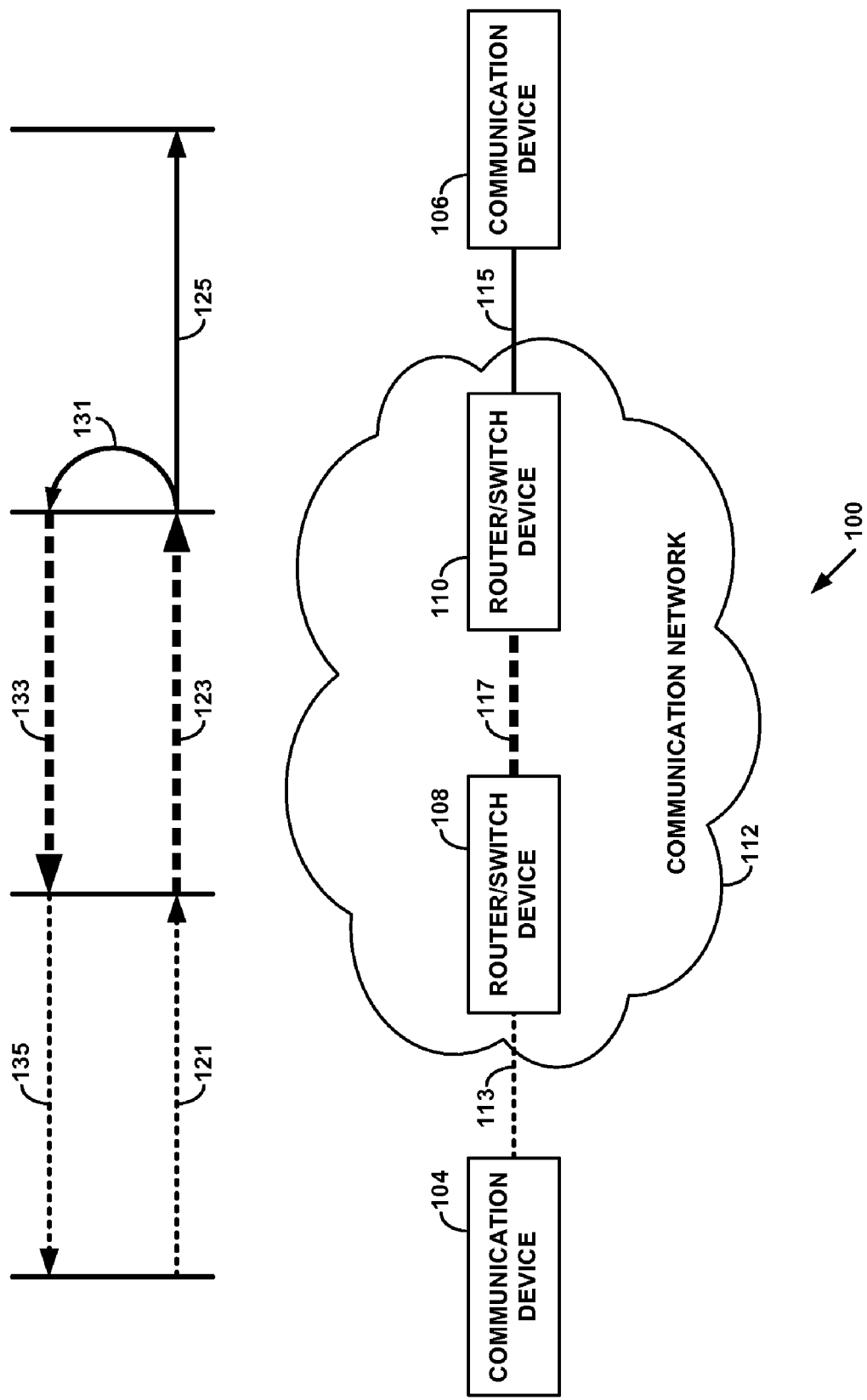

FIG. 1b reproduces FIG. 1a, but with data transmissions indicated symbolically at the top of the figure to illustrate an example of echo arising in router/switch device 110. Note that except where stated otherwise, the term data used herein may include, without limitation, voice data, fax data, and packet data, and may further include analog or digital transmissions. As depicted in the figure, communication device 104 transmits data 121 on link 113 to router/switch device 108, which in turn transfers the input to output on link 117 and transmits it as data 123 to router/switch device 110. At router/switch device 110, the input is transferred to output on link 115 as data 125 and transmitted to communication device 106, as intended. However, a portion of the input is reflected back to router/switch 108 on link 117 as echoed data 133, and ultimately to communication device 104 as echoed data 135. The reflection at router/switch device 110 follows echo path 131, as shown.

Only one source of echo is depicted in FIG. 1*b*, but in practice there may be multiple sources of echo in a communication network, depending, for example on the number and types of switching connections. Further, while certain methods and techniques may be applicable to reducing or eliminating echo from a single source, these methods and techniques do not generally work for multiple echo sources, especially if the sources come and go at different times. In accordance with a preferred embodiment of the present invention, multiple echo cancellers are integrated into a single network switch, such as router/switch 108 or 110. Each echo canceller may be adjusted to cancel echo from a particular source, and operating together, they yield a signal that is free (or nearly free) of echo.

While echo can arise in a variety of switching devices that interconnect different types of input and output physical links, it may be particularly prevalent in circuit-based telephony switches that interconnect two-wire analog loop circuits with four-wire digital trunks, or in switching devices that include these types of interconnections. Therefore, the remainder of this disclosure focuses on such switch elements as exemplary sources of echo in communications networks, and correspondingly on preferred embodiments of the present invention geared to operation in conjunction with such elements. That is, the discussion emphasizes embodiments of the invention that encompass certain aspects specific to echo that arises in the context of voice and fax communications involving circuit-based telephony switch elements. It should be understood, however, that the method and system described herein by way of example with respect to circuit-based telephony switch elements may easily be adapted to apply to any communication network in which switching components act as unintentional sources of echo.

Figure 2:
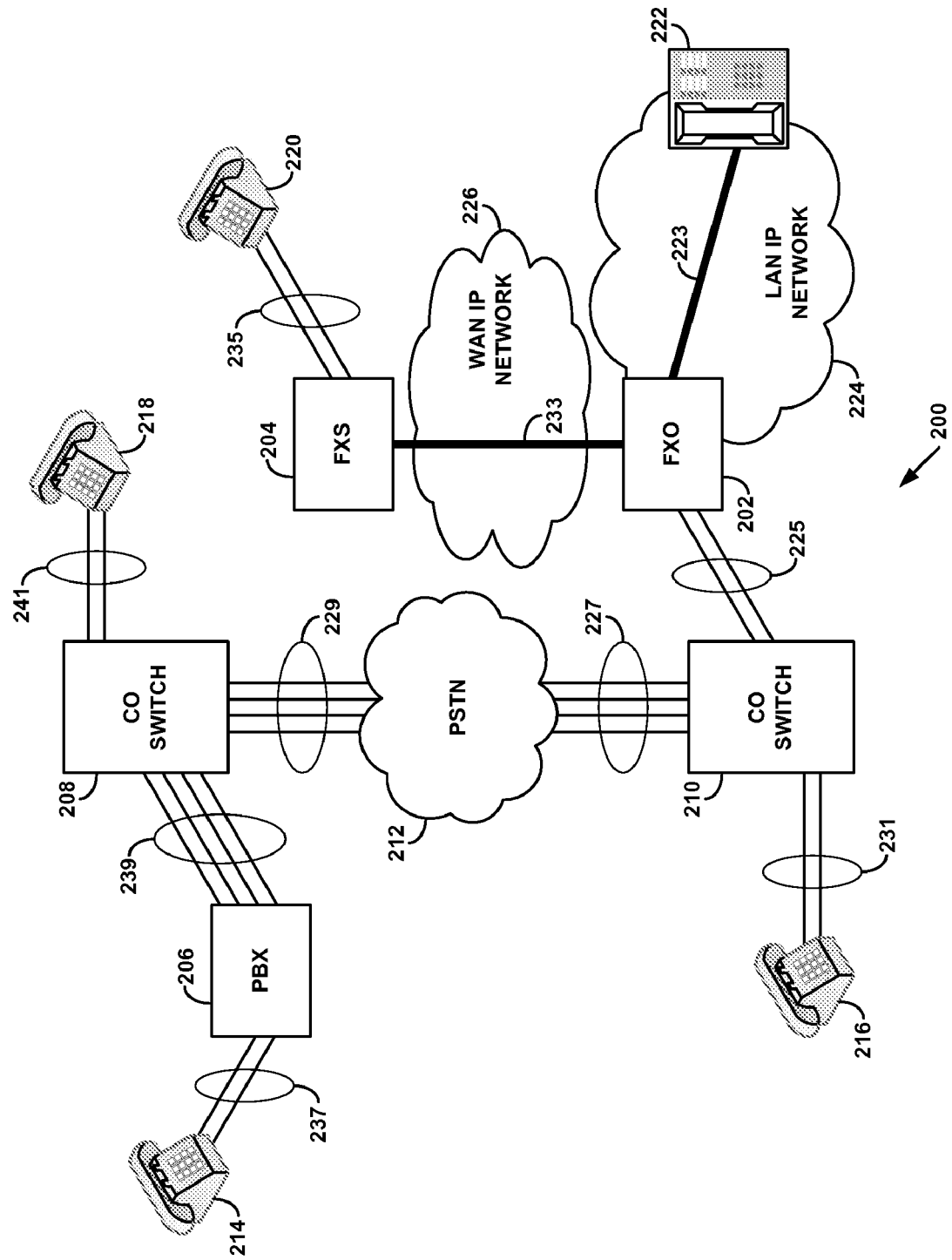
FIG. 2 is a simplified representation of a telecommunication network, including various types of switches in which echo may arise, and in which the method and system of echo cancellation of the present invention may be carried out.

FIG. 2 shows a telecommunications network 200 that includes a number of different types of telephony switches and telephones, as well as interconnection links that represent either two-wire analog lines, four-wire digital lines, or packet transport connections. Network 200 comprises CO switches 208 and 210, which provide both end-user access to the PSTN 212, for example via links 225 and 231 (CO switch 210) and links 237 and 241 (CO switch 208), and inter-switch connectivity via inter-switch links 227 and 229 to the PSTN 212. Note that inter-switch links 227 and 229 each represent a single four-wire connection that may be used for a single phone call, for example. In practice multiple such links will be bundled together in inter-switch trunks (e.g., T1, OC-48, etc.) that multiplex multiple concurrent phone calls and/or data sessions. For the purposes of this disclosure, it is sufficient to consider just a single such connection.

End users connected to CO switches 208 and 210 may include individual, residential customers, represented by analog telephones 216 and 218, for example, as well as private network customers (e.g., businesses and enterprises), represented by PBX 206 and FXO 202. Telephones 216 and 218 are connected to their respective CO switches via two-wire analog lines 231 and 241, respectively. PBX 206 is connected to CO switch 208 via a four-wire digital link 239 (e.g., an ISDN PRI digital channel), while FXO 202 is connected to CO 210 via a two-wire analog link 225 (e.g., local loop). As with the inter-switch links, digital link 239 and analog link 225 each represents a single connection of what may in practice be a larger bundle of like connections.

FXO 202 provides connectivity to VoIP (digital) telephone 222 via packet transport link 223, which is part of local area network (LAN) IP network 224. Additionally, foreign exchange station (FXS) 204 is connected to FXS 202 via packet transport link 233, and to CO switch 210 by way of FXO 202. Packet transport link 233 is part of wide area network (WAN) IP network 226. Finally, PBX 206 provides connectivity to analog telephone 214 via two-wire analog line 237, while FXS provides connectivity to analog telephone 220 via two-wire analog line 235.

Four-wire digital links 227, 229, and 239 typically transport voice (and other) data in the form of digitized samples, each sample commonly corresponding to 0.125 ms (or a sampling rate of 8,000 Hz), although other sample sizes (and rates) could be used. One pair of wires in a four-wire link is used for sending data, while the other is used for receiving data. Packet transport links 223 and 233 typically carry voice data in packets that contain groupings of sequential digital samples, each packet being assembled over a time duration equal to the number of samples multiplied by the size of each sample (i.e., the time duration required to collect the number of samples). For example, a packet containing 80 samples, each 0.125 ms in size, would correspond to a time duration of 10 ms. As explained further below, packetized voiced data may be recovered as digital samples at a receiving device by playing out the samples from the packets in the same order in which they were assembled into the packets.

Two-wire analog links 225, 231, 235, 237, and 241 carry voice data as analog signals, and thus at each of PBX 206, CO switches 208 and 210, FXO 202, and FXS 204, a conversion between analog data and digital data must be performed. Additionally, at each of PBX 206, CO switches 208 and 210, a conversion between two-wire and four-wire transmission must also take place. Further, as described below, the digital/analog conversion in FXO 202 (and possibly in FXS 204) typically also involves a two-to-four wire conversion as well. Thus, echo can arise at each of PBX 206, CO switches 208 and 210, and FXO 202 (and possibly FXS 204), specifically from the translation of four-wire input into two-wire output that occurs at these devices.

An example of a communication in which echo could arise in network 200 is a phone call between telephones 216 and 218, connected by way of CO switches 208 and 210. With respect to telephone 216, CO switch 210 is referred to as the near-end switch and CO switch 218 is referred to as the far-end switch. Similarly, with respect to telephone 218, CO switch 208 is the near-end switch and CO switch 218 is the far-end switch. In this exemplary call, voice data transmitted from telephone 216 to telephone 218 are translated from four to two wires in the far-end switch (CO 208), and thus a portion of the transmitted signal may be echoed back to telephone 216 from the far-end switch. The effect could be that a speaker at telephone 216 would hear an echo of his or her own voice delayed by the round-trip transmission time from telephone 216 to the far-end switch and back. Likewise, the four-to-two wire translation in CO switch 208 might generate a similarly-delayed echo for a speaker at telephone 218. This is only one example of echo that could arise in a network such as network 200, and other examples are possible.

Note that network 200 represents a simplified version of a more complex interconnection of different types of networks. As such, there may be other network elements present in practice that are not shown in FIG. 2. For example, PSTN 212 may include additional switches, such as tandem switches, and/or interconnecting long-distance networks (e.g., inter-exchange networks, or IXCs), as well as components of a signaling network (e.g., a signaling system 7 (SS7) network). Similarly, WAN IP network 226 may include one or more routers and switches (in which case, packet transport link 233 may actually comprise more than one physical link). Additionally, LAN IP network 224 may also include one or more routers and switches, as well as VoIP servers, for example. It should be understood that the omission of these and other possible network elements from FIG. 2 does not limit in any way the scope of the present invention. Moreover, the interconnecting elements and components shown in FIG. 2 do not represent an exhaustive list of the switching devices in which two-to-four wire echo may arise, and others are possible as well.

Exemplary Echo Sources and Echo Cancellers

Figure 3:
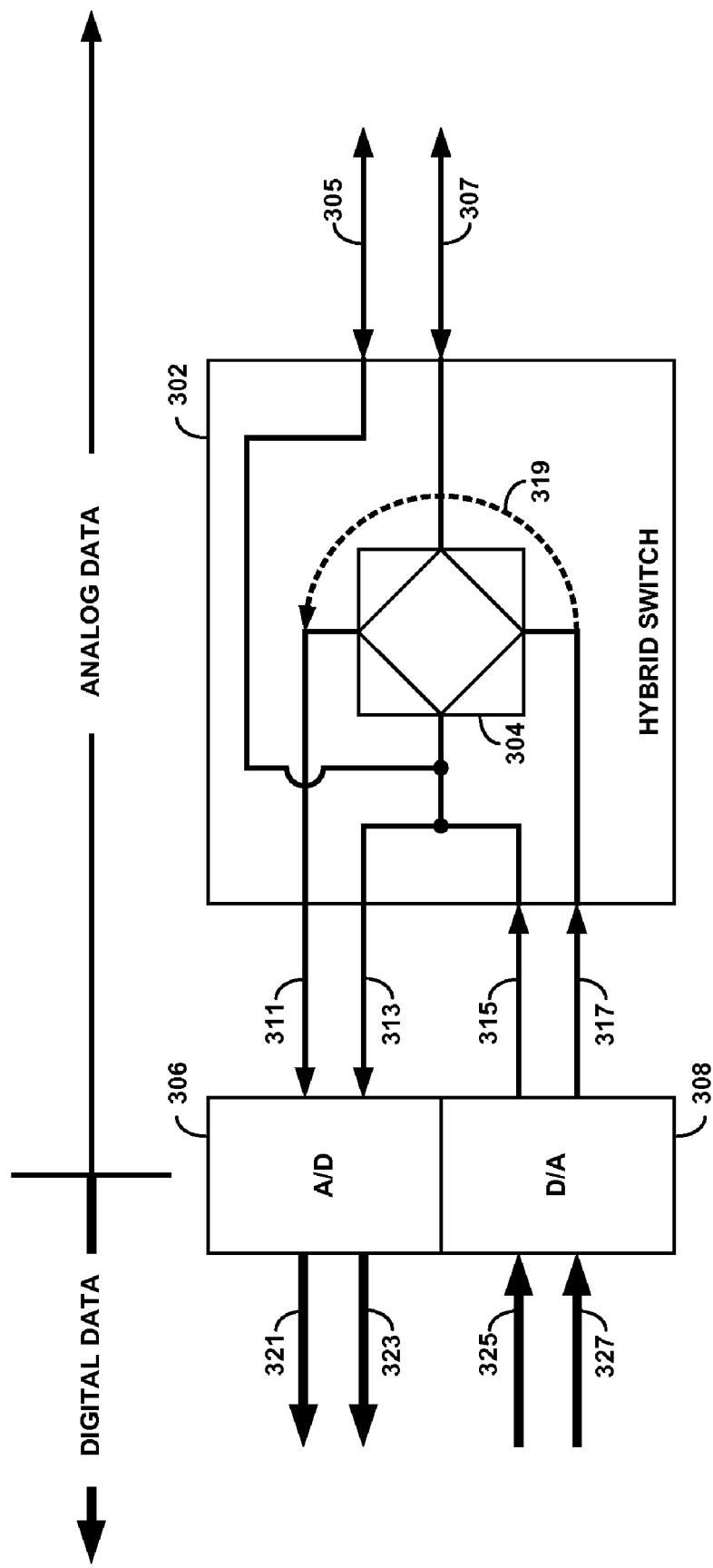
FIG. 3 is a simplified representation of a hybrid switch illustrating a device in which echo may arise.

The circuit element in a two-to-four/four-to-two wire conversion that gives rise to echo operates on analog signals, and is referred to as a hybrid. A simplified depiction of a hybrid is shown in FIG. 3. As seen in the figure, hybrid switch 302 includes hybrid circuit 304, and translates between a two-wire analog link comprising analog lines 305 and 307 and a four-wire analog link comprising analog line pair 311, 313 and analog line pair 315, 317. Also included in FIG. 3 are an analog-to-digital converter A/D 306 that transmits digital signals from the switch on digital line pair 321, 323, and a digital-to-analog converter D/A 308 that receives digital signals on digital line pair 325, 327.

Analog lines 305 and 307 form a two-wire circuit (e.g., a local loop circuit) that carries analog signals transmitted in both directions; i.e., both to and from hybrid switch 302. Analog signals received at hybrid switch 302 on analog loop lines 305, 307 are sent from the switch first on analog line pair 311, 313, following two-to-four wire translation at hybrid circuit 304, and then after conversion to digital signals at A/D 306, on digital line pair 321, 323. Digital signals received at hybrid switch 302 on digital line pair 325, 327 are first converted to analog signals at D/A 308 and transmitted to the switch on analog line pair 315, 317, then sent from the switch on analog loop lines 305, 307 following four-to-two wire translation at hybrid circuit 304.

As indicated in FIG. 3, echo arises as the reflection of input to output on the four-wire side of hybrid circuit 304. Specifically, analog input on analog line 317 is reflected on echo path 319 to analog output on analog line 311, where it is mixed with intended analog output originating from analog loop lines 305, 307. Thus, while analog input from a sender on the four-wire side via digital line pair 325, 327 is intended for output on analog loop lines 305, 307, a portion of the input signal is leaked back to the sender via echo path 319, analog line 311, and A/D 306. At the same time, analog input from a sender on the two-wire side intended for output on analog line pair 311, 313 becomes polluted with the reflected signal from echo path 319. Reflected signal arising in this manner in a hybrid is generally referred to as hybrid echo.

Figure 4A:
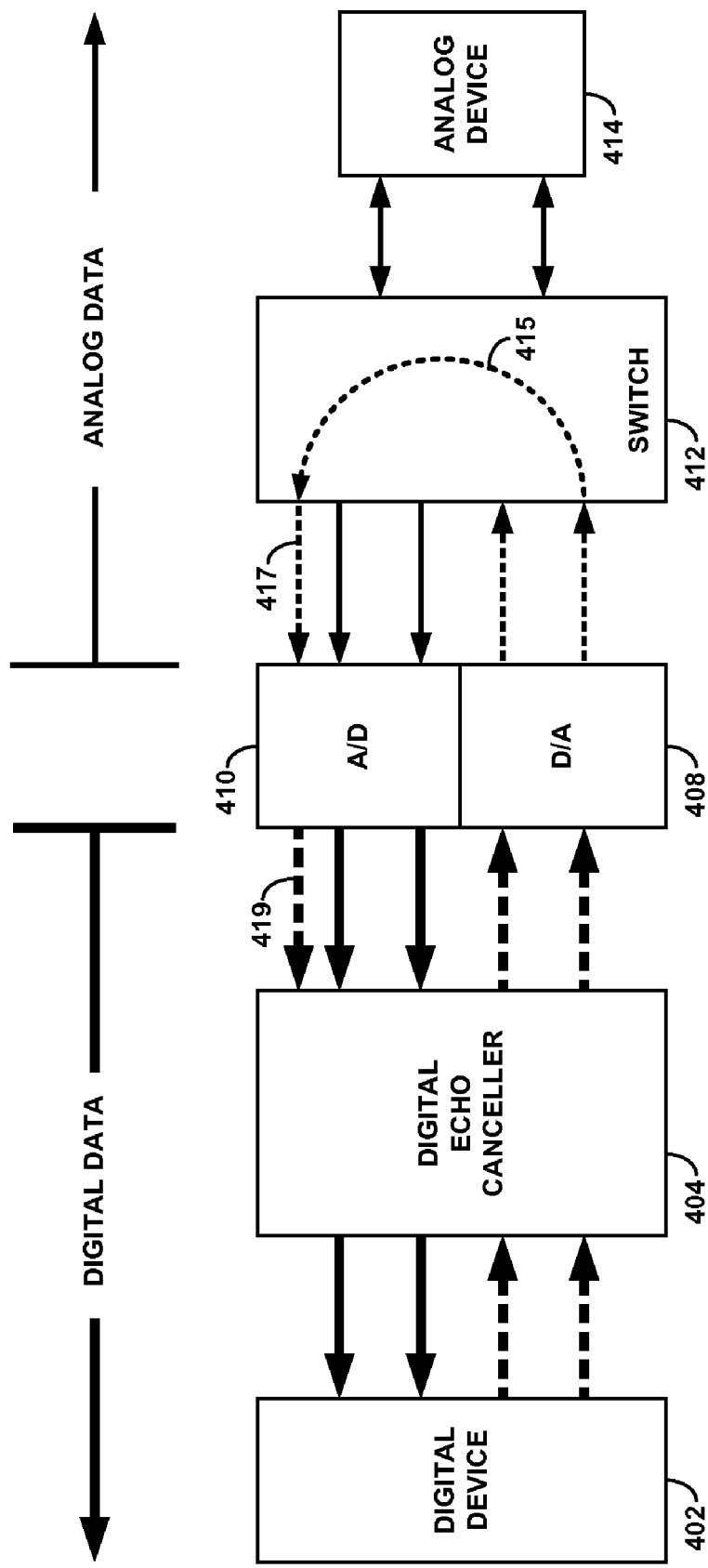
FIGS. 4 (a and b) is a simplified representation digital echo cancellation (a) and analog echo cancellation (b).
Figure 4B:
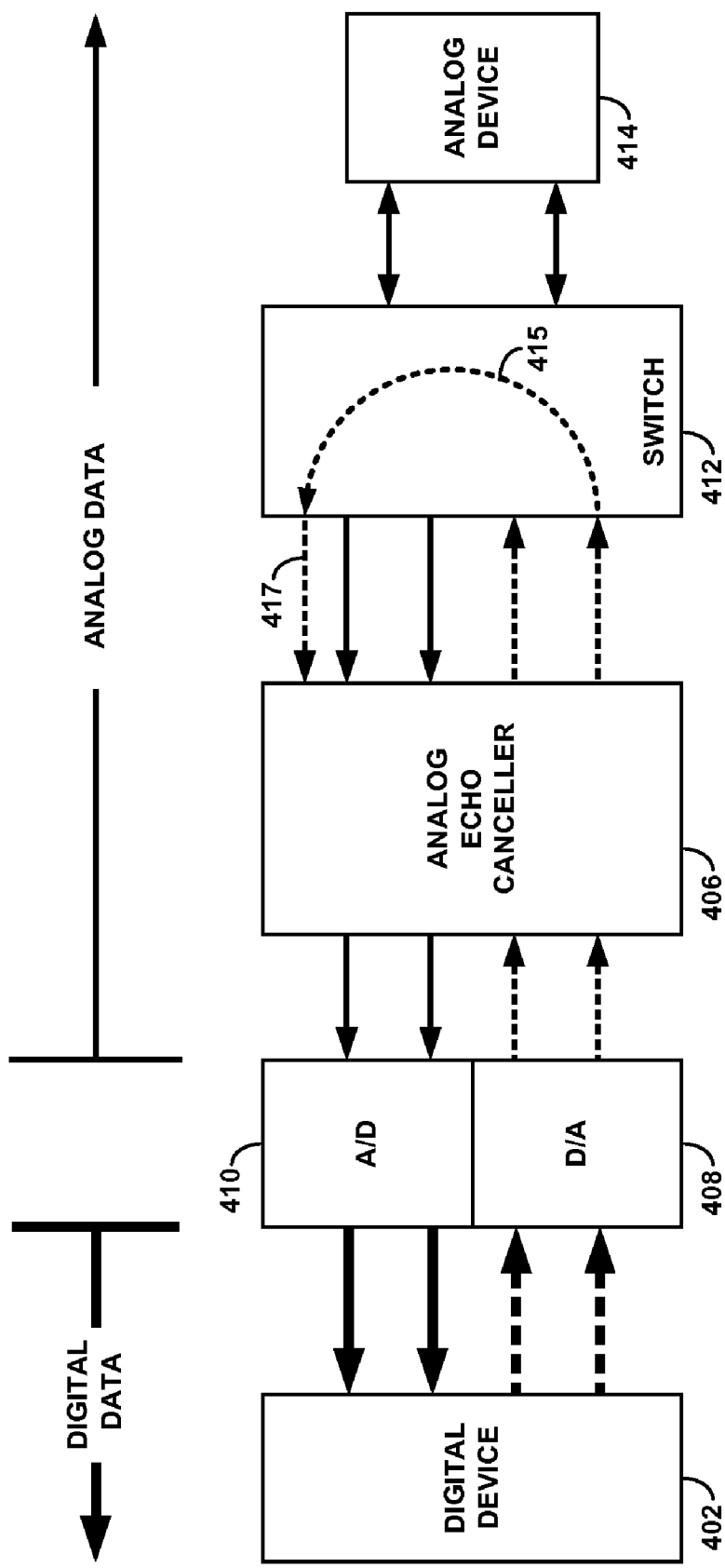

The effects of a single source of hybrid echo can be reduced or eliminated by introducing an echo cancelling function in the line between the echo source and the receiver that would otherwise receive the polluted signal. FIGS. 4a and 4b illustrate two possible approaches that may be adopted. In FIG. 4a, echo cancellation is applied to the digital signal, while in FIG. 4b, echo cancellation is applied to the analog signal. In both figures, a single switch 412 containing an echo path 415 is representative of hybrid switch 302 in FIG. 3, although the internal structure is omitted from switch 412 for the sake of brevity. Also, in FIGS. 4a and 4b, the echoed signal is represented as a distinct signal from the intended signal that it pollutes, the depiction in this manner serving to illustrate the operation of echo cancellation. In practice both the intended signal and the reflected signal are combined additively.

In FIG. 4a, an analog device 414, such as an analog phone, is connected to the two-wire side of switch 412 via an analog loop circuit, indicated by the pair of double-ended arrows. A digital device 402, such as a digital switch or digital signal processing components of a VoIP gateway, for example, is connected to the four-wire side of switch 412 by way of intervening digital echo canceller 404 and D/A and A/D converters 408 and 410. Digital signal paths are depicted as thick lines and analog signals as thin lines. Additionally, data transmitted from digital device 402 are shown in dashed lines, while data transmitted from analog device 414 are shown in solid lines (note that the analog loops lines between analog device 414 and switch 412 actually carry data in both directions).

Digital signals transmitted from digital device 402 to analog device 414 arrive at D/A 408 by way of digital echo canceller 404. These signals are then passed through the echo canceller unaltered. The digital signals are converted to analog signals by D/A 408 and transmitted to switch 412 for intended transmission to analog device 414, following four-to-two wire translation as explained, for instance, in connection with the discussion of FIG. 3. A portion of the signal intended for transmission to analog device 414 is reflected back on echo path 415 toward digital device 402. The reflected signal emerges from switch 412 as echo analog signal 417.

In the opposite direction, analog signals transmitted from analog device 414 to digital device 402 arrive at the two-wire side of switch 412 where they are translated to the four-wire side of the switch. The signals from switch 412 intended for transmission to digital device 402 become polluted with echo analog signal 417, and both intended and echo signals converted to digital signals by A/D 410 and then passed to digital echo canceller 404. In the figure, digital echo signal 419 represents the digital conversion of analog echo signal 417.

At digital echo canceller 404, digital echo signal 419 is removed (or at least reduced), so that the output of the echo canceller toward digital device 402 contains only the intended digital form of the signals transmitted from analog device 414. Thus, digital echo canceller 404 is applied to the digital form of the polluted signal to remove echo. An explanation of how this is accomplished is provided below. Digital echo canceller 404 may comprise one or more components of a digital signal processing system.

FIG. 4b depicts a very similar configuration to FIG. 4a, except that (i) the digital echo canceller is replaced in FIG. 4b with analog echo canceller 406, and (ii) the echo canceller and the D/A and A/D converters 408 and 410 swap positions in the signal paths between digital device 402 and switch 412. Thus in the case of analog echo cancellation, echo analog signal 417 is removed (or reduced) by analog echo canceller 406 prior to conversion by A/D 410. Analog echo cancellation is applied to analog signals, and may be accomplished with various active and passive analog circuit elements. The techniques for the case of a single source of echo are well-known in the art, and are not described further here.

While the relative positions along the signal paths of the echo cancellers in FIGS. 4a and 4b are indicated, their locations in the network are not. In practice, the echo canceller is generally located either in the far-end switch device that gives rise to echo, or in the near-end switch device connected to the source of the transmitted signals that are echoed back at the far end. Analog echo cancellation might be more commonly targeted at echo generated by the local switch, since it must be applied prior to A/D conversion and transmission from the four-wire side of the switch. Other arrangements are possible as well.

On a call-by-call basis, calls connected through a given near-end switch may be routed through different far-end switches. Some far-end switches may incorporate echo cancellation for locally-generated echo, and others may not. Thus, incorporating echo cancellation in the near-end switch device is advantageous since it covers those calls in which the far-end switch device generates but does not cancel echo. In some instances, there may be more than one source or echo, so it becomes particularly advantageous for a near-end switch to incorporate echo cancellation that can cancel echo from multiple sources. Before explaining how this may be done, it is useful to consider how digital echo cancellation is accomplished.

Figure 5:
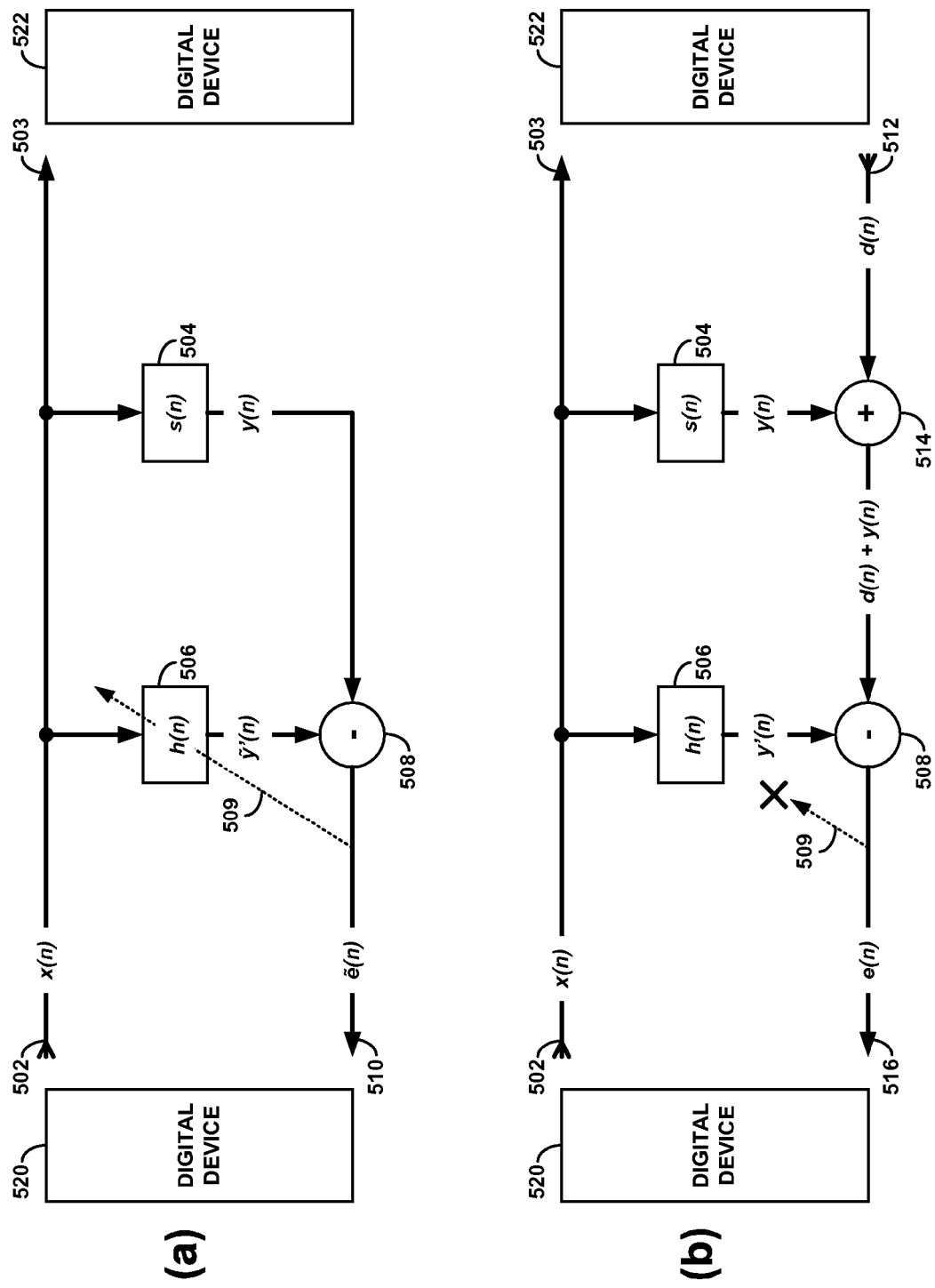
FIG. 5 illustrates a method and system for digital echo cancellation using an adaptive filter.

FIG. 5 illustrates how cancellation of echo in a digital signal may be established. For purposes of illustration, FIG. 5 shows communication between two digital devices 520 and 522, where digital transmissions from digital device 520 to digital device 522 are subject to echo. Digital devices 520 and 522 are not required for the operation of digital echo cancellation, but are introduced in here to aid the discussion by helping identify the sources and destinations of the various input and output signals described in the present discussion. Conceptually, the process may be divided into two stages. In the first stage, depicted in the top part of FIG. 5 (labeled "(a)"), only input from digital device 520 is present; i.e., in the absence of echo cancellation, digital device 520 would receive pure echo of its input. (Note that the term "pure echo" used herein is intended to apply to a signal that comprises echo of a particular input signal, without additional signals mixed in. The term "pure" does not imply that the echoed signal is free of distortion that may arise from the echo path that produces the echo signal. Indeed, the echo signal typically is a distorted version of the original input signal.) During this first stage, the digital echo canceller is adjusted, or trained, to cancel the pure echo signal. In the second stage, depicted in the bottom part of FIG. 5 (labeled "(b)"), transmissions from digital device 522 to digital device 520 are present as input in addition to echo signal, and training of the digital echo canceller is suspended. During the second stage, transmissions from digital device 522 may be received at digital device 520 with little or none or its own echo, owing to operation of the digital echo canceller. In practice, the operation of a digital echo canceller may alternate between the two stages according to the presence or absence of signal from digital device 522 (or similarly-placed device).

In the first stage, digital device 520 transmits digital signal $x(n)$ as input 502, where $x(n)$ represents a contiguous train of digital samples indexed by n. While $x(n)$ is intended for transmission to digital device 522 as output 503, a portion of $x(n)$ is reflect back to digital device 520 on an echo path characterized by digital impulse response $s(n)$ 504. Digital impulse response $s(n)$ applied to $x(n)$ yields an echo signal $y(n)$. Note that the actual echo may be an analog signal generated on an echo path in a portion of analog circuitry, as illustrated in FIGS. 4a and 4b, for example. However, in the digital domain, for instance following conversion by A/D 410 in FIG. 4a, the digital echo signal may be represented as $y(n)$, and the echo path characterized by $s(n)$. Mathematically, $y(n)$ may be thought of as the convolution of $x(n)$ with $s(n)$ taken in either the time domain or the frequency domain. Generally, $s(n)$ is unknown, while its output $y(n)$ is observed as unwanted echo. That is, without echo cancellation, $y(n)$ would be reflected back as echo to the digital device 520.

Echo cancellation is accomplished by introducing in parallel with impulse response $s(n)$ 504 an adaptive digital filter 506 characterized by digital response $h(n)$, and adaptively adjusting $h(n)$ so that its output cancels $y(n)$. That is, with $x(n)$ as input to $h(n)$, the output $\tilde{y}'(n)$ may be adjusted or trained during the first stage by adjusting a set of discrete coefficients that comprise digital filter $h(n)$ 506. Subtracting $\tilde{y}'(n)$ from $y(n)$ in differencer 508 yields an error signal $\tilde{e}(n)$, which may be fed back to digital filter $h(n)$ 506 while the filter is training, as indicated by the dotted feedback line 509, as well as transmitted to digital device 520 as output 510. Mathematically, $\tilde{y}'(n)$ may be thought of as the convolution of $x(n)$ with $h(n)$ computed while the coefficients of $h(n)$ are being adjusted during the first stage according to feedback of $\tilde{e}(n)$. When a minimum level of $\tilde{e}(n)$ is reached, maximum echo cancellation is achieved, and the filter is said to have trained. Determining the level of $\tilde{e}(n)$ is preferably carried out by computing a time-averaged value of the power of $\tilde{e}(n)$ over a time window of a prescribed width (i.e., a window of a prescribed number of samples). In operation, the training process is continuous during the first stage, so that $h(n)$, $\tilde{y}'(n)$, and $\tilde{e}(n)$ are being continuously adjusted, for instance in response to temporal fluctuations in the properties $s(n)$.

In the second stage, digital device 522 may transmit digital signal $d(n)$ as input 512, which is combined with $y(n)$ by adder 514 to produce polluted signal $d(n)+y(n)$. Consequently, the error signal, now designated as $e(n)$, contains $d(n)$. With signal from digital device 522 mixed in, feedback from $e(n)$ will cause the echo canceller to stray from cancelling $y(n)$. That is, feedback will cause $e(n)$ to increase. Under this condition, training is frozen, as indicated by the truncation of line 509. During stage 2, then, $h(n)$ is frozen in its state from just after the transition from the first stage to the second stage. Assuming this is a satisfactory state (i.e., echo signal $y(n)$ canceled), then $e(n) \approx d(n)$, and digital device 520 receives the unpolluted (or nearly unpolluted) input from digital device 522.

During the first stage $h(n)$ must train on the pure echo of input signal $x(n)$; i.e., input $d(n)$ from digital device 522 is not present while $h(n)$ is training. For example, in application to a voice phone call, $x(n)$ during the first stage may correspond to a short sequences of digitized samples of voice data sent from digital device 520 while the party associated with $d(n)$ (transmitted from digital device 522) momentarily remains silent. Alternatively, during the first stage $x(n)$ may be a test signal, such as white noise, sent from digital device 520 (though not necessarily generated by the device). Once training is complete, the test signal is removed, and $x(n)$ is just usual voice data.

Mathematically, training of $h(n)$ may be based on a variety of methods, including, for instance, a normalized least mean square (NLMS) algorithm, in which case training corresponds to convergence of the algorithm. Proper convergence requires a sufficient number of digital samples of $y(n)$ free of any samples of $d(n)$, or correspondingly a time interval during which $x(n)$ is the only input. Typical values of this time interval range from about 125 to 250 ms, or 1,000 to 2,000 samples for 0.125 ms samples, but other time interval durations (and numbers of sequential samples) may be used. The number of coefficients that make up filter $h(n)$ need not be the same as the sample size used in training, and usually is smaller; filter sizes about 256 coefficients are typical, although other sizes are possible.

If $d(n)$ is introduced before $h(n)$ has had sufficient time to train, the NLMS algorithm (or other possible algorithms) may diverge rather than converge, resulting in an improperly trained filter and incomplete or poor quality echo cancellation. In some applications, persistent signal $d(n)$ during the first stage may impede proper convergence. Thus the present invention includes a method and system for removing certain types of persistent input $d(n)$, thereby creating a first stage of echo cancellation where one might not otherwise be possible. Details are provided below.

Practical embodiments of digital echo cancellation may be realized using one or more digital signal processors (DSPs) or DSP-based system, although other means are possible as well. In an exemplary embodiment, a DSP or DSP system could include, without limitation, machine language instructions executable to carry out the functions associated with determining the coefficients of h (n), receiving x(n) as input, receiving y(n) and d(n) as input, applying h (n) to x(n) to yield ŷ'(n) and y'(n), implementing differencer 508 (or similar function), implementing adder 514 (or similar function), determining ê(n) and e(n), and applying feedback ê(n). Further, the preceding discussion in connection with FIG. 5 represents a generalized explanation of digital echo cancellation. As such, various details may be altered without changing the scope of, or imposing any limitations on, the applicability of digital echo cancellation with respect to the current invention.

Cancellation of Multiple Echo Sources

Figure 6:
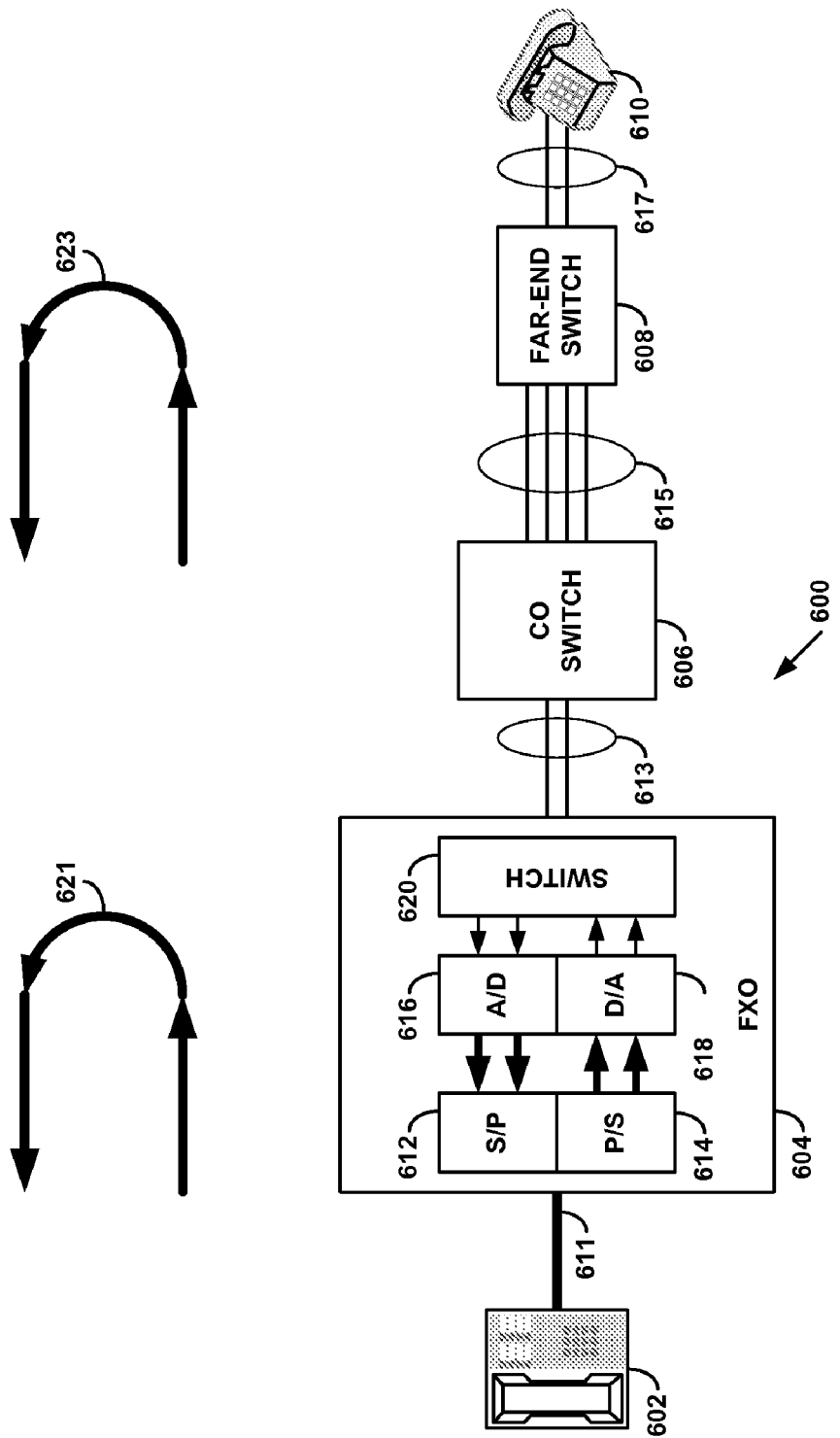
FIG. 6 is a simplified representation of a network in which two sources of echo may arise in the same signal path.

The problem of multiple echo sources in a network may be understood by considering network 600 in FIG. 6, which illustrates a communication path between VoIP telephone 602 and analog telephone 610 by way of intervening switch devices FXO 604, CO switch 606, and far-end switch 608 (far-end with respect to VoIP telephone 602). VoIP telephone 602 is connected to FXO 604 via packet transport link 611, and analog telephone 610 is connected to far-end switch 608 via two-wire analog loop link 617. CO switch 606 provides connectivity between FXO 604 and far-end switch 608 via two-wire analog loop link 613 to the FXO and four-wire digital link 615 to the far-end switch. The devices and connections shown in FIG. 6 could represent a communication path between VoIP telephone 222 and analog telephone 218 in FIG. 2, for example. Note that with respect to VoIP telephone 602, FXO 604 is the near-end switch.

FIG. 6 also depicts a simplified view of components of FXO 604 that comprise certain aspects of a VoIP gateway for interworking between packet voice data and circuit-switch voice data. Packetized voice data transmitted by VoIP telephone 602 are played out as digital samples by packet-to-sample (P/S) process 614, then converted to analog signals by D/A 618. For instance, P/S 614 could receive and buffer packets from VoIP telephone 602, then sequentially play out samples from the packets, possibly with a codec, and transmit them to D/A 618. The digital output of P/S 614 could correspond to digital line pair 325, 327 in FIG. 3, for example, while the analog output of D/A 618 could correspond to analog line pair 315, 317 in the same figure. Switch 620 then translates the analog output of D/A 618 to the two-wire side of FXO 604 for transmission to CO switch 606, and ultimately to analog telephone 610.

Analog signals from CO switch 606 to FXO 604 (originating at analog telephone 610) are translated to the four-wire side of switch 620 and passed to A/D 616, then converted to digital signals and passed as digital samples to sample-to-packet (S/P) process 612, where the digital samples are packetized and transmitted to VoIP telephone 602. For instance, S/P 614 could receive digital samples from A/D 616, possibly process them with a codec, then assemble them sequentially in media data packets and transmit the packets to VoIP telephone 602. The size of each media packet and the time required to assemble it depends on the number of digital samples per packet and the sample size (or sampling rate). The analog input to A/D 616 could correspond to analog line pair 311, 313 in FIG. 3, for example, while the digital output of A/D could correspond to digital line pair 321, 323 in the same figure.

Since both switch 620 in FXO 604 and far-end switch 608 include four-to-two wire conversions, both may be sources of echo directed to VoIP telephone 602, as indicated by the two echo paths shown in FIG. 6. Echo path 621 is associated with switch 620 in FXO 620, and echo path 623 is associated with far-end switch 608. If the far-end switch does not implement echo cancellation, then signal from echo path 623 will be returned to FXO 602. In this case, VoIP telephone 602 will receive echo from both echo paths. The difficulty in cancelling echo from both sources is that, as explained further below, they have different echo path characteristics, and arise at different times with respect to call setup. Consequently, the procedure for establishing echo cancellation with a single echo canceller (as described in connection with FIG. 5, for example) cannot be carried out because a single adaptive filter (e.g., h(n) 506 in FIG. 5) sees an multiple echo path impulse responses that change abruptly with time. Moreover, the presence of certain persistent call setup signals may further impede training. The present invention is directed at a system and method for cancelling echo from both sources.

Before describing how multiple sources of echo may be cancelled according to the present invention, it is useful to consider set up of a call between VoIP telephone 602 and analog telephone 610. For purposes of illustration, it is assumed that VoIP service (in a network such as LAN IP network 224 in FIG. 2, for example) is provided using the Session Initiation Protocol (SIP) to establish and manage media sessions, and the Real-time Protocol for transport of packetized media data (e.g., voice). It should be understood that these assumptions are not intended to be limiting with respect to the present invention, and that other protocols may be used.

As described above, FXO 604 provides interworking between the packed-based VoIP network and the circuit-switched voice network. Typically, the two-wire side of an FXO comprises one or more analog loop ports that may be connected to one or more analog lines at a PSTN end office; i.e., two or more lines to a CO switch, for instance. Thus analog loop line 613 represents a connection between one analog loop port on FXO 602 and an analog line in CO switch 606 (e.g., a connection to a specific line card in the CO switch). As described above in connection with S/P 612 and P/S 614 in FXO 602, part of the interworking involves translation of media between the packet side of a call and the circuit-switch side. Part of the interworking also involves translation of signaling and call control messages that setup and manage the call. Note that while certain functional aspects of signaling and call control translation are assumed in the discussion below, elements of FXO 604 that might carry out them out are not shown in FIG. 6.

For illustrative purposes, an exemplary call placed from VoIP telephone 602 to analog telephone 610 is described. However, a call could be placed in the reverse direction without impacting operation of the invention. Further, analog telephone 610 could be any analog device that connects to the two-wire side of far-end switch 608. Moreover, the path between FXO 604 and far-end switch 608 could include other intermediate switches in addition to CO switch 606. For example, referring momentarily to FIG. 2, an exemplary call placed from VoIP telephone 222 to analog telephone 214 would traverse three intermediate switches, namely CO switches 210 and 208, and PBX 206.

A caller at VoIP telephone 602 initiates the call by sending an off-hook signal to FXO 604, for example a lifting the handset or pushing a button. An RTP session may then be established between the FXO and the VoIP telephone for transport of media data, where RTP is the protocol used for transport of media data packets in the VoIP network. The FXO in turn completes analog loop line circuit 613 with CO switch

606, indicating an off-hook condition to the CO switch. CO switch 606 then plays dial tone to FXO 604, which in turn plays it to VoIP telephone 602 via the RTP session. The connection to CO 606 is established across switch 620, and therefore any signal from VoIP telephone 602 may be echoed back to the telephone along with dial tone from the CO switch. Note that the presence of dial tone may be considered as signal d(n) in connection with the discussion of FIG. 5 above.

The caller may then dial the phone number of analog telephone 610. VoIP telephone 602 may then send a SIP INVITE message to FXO 604, which in turn generates appropriate DTMF digits and transmits them to CO switch 606. Alternatively, VoIP telephone 602 may transmit DTMF digits as packetized media data. Other methods of transmitting the dialed number are possible as well. When CO switch 606 receives the dialed digits (or at least an initial subset of them), it ceases playing dial tone. Once it receives all of the dialed digits, it places the call, and call setup then proceeds as usual in a circuit-switched network. Far-end switch 608 causes analog telephone 610 to ring, and also transmits ringback to VoIP telephone 602. At this point, ringback has replaced dial tone as the signal d(n), and echo from switch 620 may still be present as well.

Assuming the called party answers the call, analog telephone 610 will go off-hook and analog loop line circuit 617 will be complete. Far-end switch 608 will detect the off-hook condition and a four-to-two wire connection will become active. At this point, far-end switch 608 becomes a second source of echo for VoIP telephone 602. If far-end switch 608 does not incorporate echo cancellation for its own, locally-generated echo, then the caller at VoIP telephone 602 will here an echo of his or her own voice when speaking. Furthermore, the echo will be from a combination of two sources, one in FXO 604 and the other in far-end switch 608.

The exemplary call just described highlights how and when two sources of echo may arise in a phone call that traverses two four-to-two wire switches. As discussed above, a single echo canceller may not adequately cancel echo from two sources of echo, particularly when they arise at different times. Therefore, the present invention solves this problem by implementing two echo cancellers in series, one for each echo source. Because one of the sources of echo is the near-end switch (FXO 604 in the exemplary call), the present invention incorporates both echo cancellers in this switch device. Note that the echo cancellers could possibly be implemented in the packet telephone itself (e.g., VoIP telephone 602).

Figure 7:
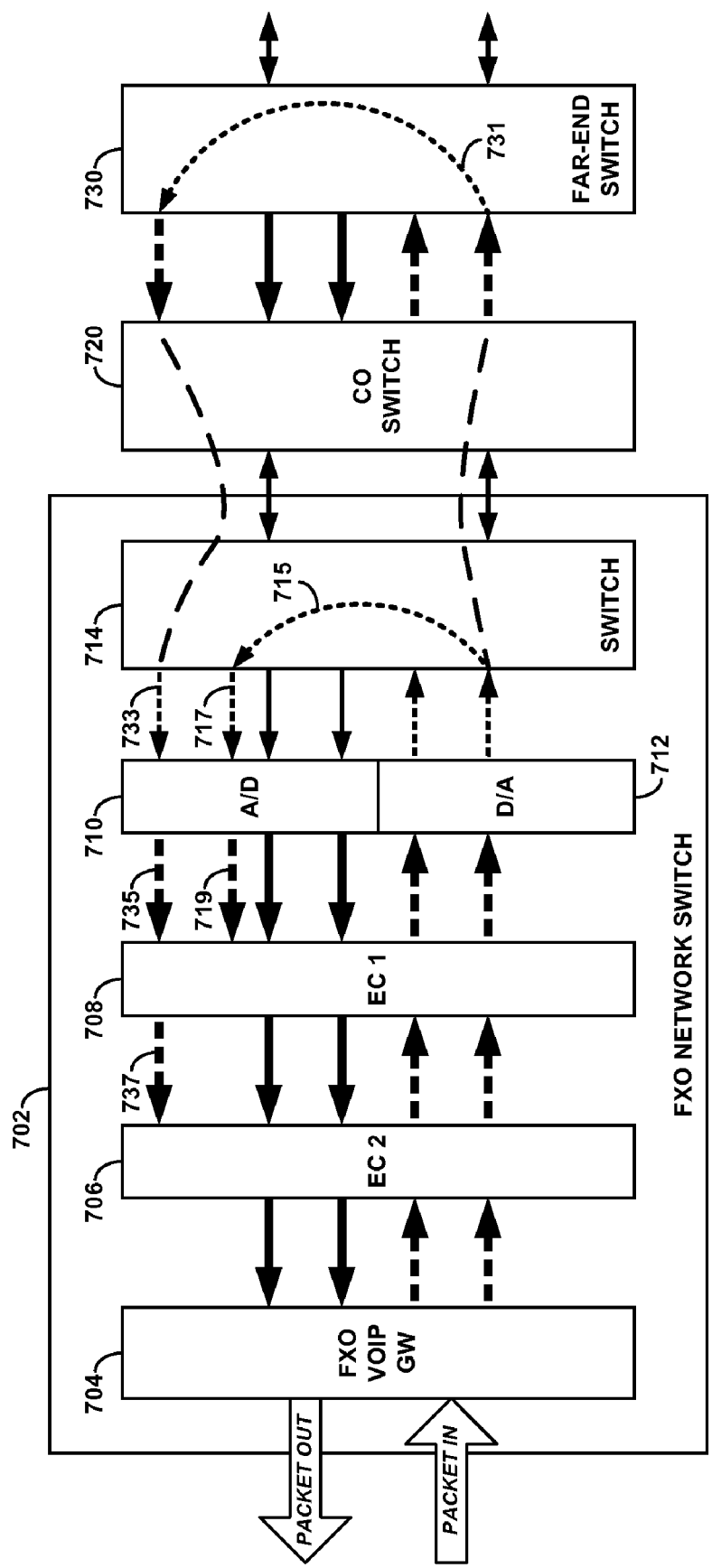
FIG. 7 is a simplified representation of an embodiment of a method and system for cancelling echo from two echo sources in the same signal path.

By way of example, FIG. 7 shows a simplified view of two digital echo cancellers in an FXO network switch 702, the FXO switch being connected to a far-end switch 730 via a CO switch 720. As shown in the figure, FXO network switch 702 includes FXO VoIP gateway (GW) 704, echo cancellers EC 1 708 and EC 2 706, A/D 710, D/A 712, and switch 714. In the present context, the term FXO network switch (or just network switch) refers to a device such as FXO network switch 702 that incorporates a switching element (such as switch 714) as well as possibly other components related to data transmission and switching functionality (e.g., A/Ds, D/As, echo canceller, transcoding functions, etc.).

Packet media data arrive at the FXO VoIP GW 704 of FXO network switch 702, as indicated by the broad arrow labeled "Packet In," and are converted to digital samples by the FXO VoIP gateway, for instance as described above. The digital samples are then passed to D/A 712 by way of the two intervening echo cancellers 706 and 708, which do not alter in any way the digital data passed from the FXO VoIP gateway. As indicated, the digital samples are converted to analog signal by D/A 712, then passed to switch 714 for transmission to far-end switch 730 by way of CO switch 720, and ultimately for transmission from the two-wire side of the far-end switch.

In the reverse direction, analog signal from the two-wire side of far-end switch 730 is transmitted to the two-wire side of switch 714 in FXO network switch 702 by way of CO switch 720. This analog signal is switched to the four-wire side of switch 714, converted to digital samples by A/D 710, then passed to FXO VoIP GW 704 (by way of the two echo cancellers) where they are packetized and transmitted as indicated by the broad arrow labeled "Packet Out." The dashed arrows in the figure represent transmission from the packet side to the analog side of FXO network switch 702, while the solid arrows represent transmission in the opposite direction. The thick lines represent digital data, while the thin lines represent analog data.

As discussed above, echo can arise both in switch 714 and in far-end switch 730, as indicated in FIG. 7 by echo paths 715 and 731, respectively. In the FXO, reflected signal from echo path 715 emerges from the four-wire side of switch 714. For illustrative purposes, this first reflected signal is represented as a distinct echo analog signal 717, and after conversion by A/D 710, as echo digital signal 719. Reflected signal from echo path 731 in far-end switch 730 is received at the two-wire side FXO network switch 702 and is translated to the four-wire side of the switch 714. This second reflected signal is represented for illustrative purposes as a distinct echo analog signal 733, and after conversion by A/D 710, as echo digital signal 735. (Note that the two long-dashed, wavy lines between the four-wire side of switch 714 and the four-wire side of CO switch 720 represent the communication paths (i) between the transmission from FXO network switch 702 and CO switch 720 and (ii) between the input to CO switch 720 of echo from far-end echo path 731 and echo analog signal 733, respectively.)

According to a preferred embodiment of the present invention, EC 1 708 cancels echo from echo digital signal 719, but passes signal that still includes echo from echo digital signal 735 to EC 2 706, which then cancels this latter echo. Thus, the output of EC 2 706 in the direction of FXO GW 704 is free (or nearly free) of echo. Note that if there are additional sources of echo in the path, additional echo cancellers could be added to FXO network switch 702 (or other similar device).

In further accordance with the preferred embodiment, the operation of each echo canceller is activated only when the source of echo to which it is targeted is present. Thus, for example, if the far-end switch traversed for a given phone call already incorporates echo cancellation, EC 2 706 may not need to be operational for that call. The aspects of the invention that address how and when an echo canceller becomes operational for a given call are discussed below. For purposes of illustration, it is convenient to describe the operation of multiple echo cancellers in an FXO network switch (or similar device) in the context of a phone call placed by a phone in the VoIP network that is serviced by the switch (e.g., VoIP telephone 602 in FIG. 6). Further, in order to facilitate the discussion, it is useful to separate call setup into two conceptual phases, namely (i) from the time that the calling phone goes off-hook until the called phone goes off-hook (answering the call), and (ii) after the called phone goes off-hook and two-way media is established (e.g., conversation begins). In the following discussion, call setup during each phase is first described in the absence of echo cancellation, then call setup during each phase is described wherein echo cancellation is applied in accordance with the present invention. The network configuration, call setup, and conceptual phases described in the discussion below are exemplary, and should not be viewed as limiting the scope or spirit of the present invention in any way. Similarly, the invention is not limited with respect to which of the two endpoints originate the call; in the event of a call originated from the far-end side, different conceptual call phases might apply, but the number and nature of the echo paths are the same.

Figure 8:
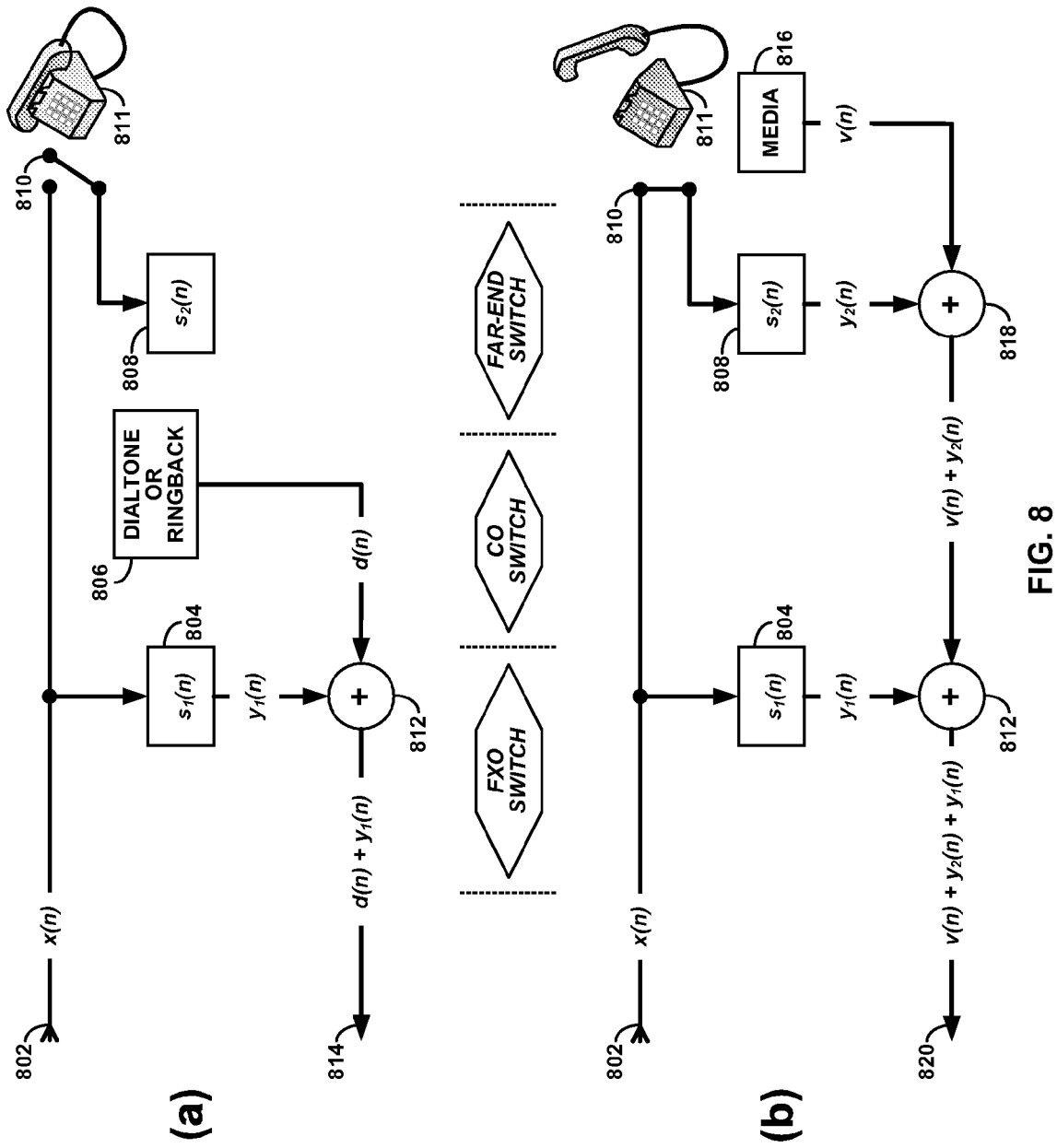
FIG. 8 illustrates in simplified form a signal path that combines two sources of echo.

FIG. 8 illustrates the two phases of call setup in the absence of echo cancellation for the case of two sources of echo. In phase 1, shown at the top of the figure (labeled "(a)"), the caller goes off-hook and initially receives dial tone, then ringback once the caller has dialed the called party's number (but prior to the call being answered). In phase 2, shown at the bottom of the figure (labeled "(b)"), the called party has answered and two-way media (e.g., conversation) may flow. By way of example, three regions of path segments are shown for both the top and bottom of the figure, namely, "FXO switch," "CO switch," and "far-end switch." These three regions, referenced in the following discussion, indicate where along the physical route of the signal path various processes and actions take place.

As shown in FIG. 8, during phase 1, called phone 811 is on-hook, so circuit connection 810 is open (i.e., not connected). As noted, either dial tone or ringback, represented by d(n), are played by the CO switch during this phase. Signal x(n) from the calling phone enters at input 802 and is echoed back via echo path 804 in the FXO switch. In phase 1, x(n) could be ambient noise from the caller's physical environment that arises while the caller waits for call to be answered, for instance. Echo path 804 is characterized by impulse response $s_1(n)$, where the subscript signifies the first echo path. The echo signal $y_1(n)$ is combined with d(n) by adder 812 in the FXO switch, and their sum is transmitted to output 814 as indicated, where the caller may hear echo of any input even before the called party answers. Before the called phone goes off-hook (i.e., before the called party answers), the echo path 808 in the far-end switch has no effect on the output 814.

In phase 2, phone 811 goes off-hook (called party answers the call) as indicated by closed circuit connection 810. At this point, far-end switch echo path 808, characterized by impulse response $s_2(n)$, is introduced into the signal path; the subscript signifies the second echo path. Dial tone and ringback are now replaced by media data v(n) from phone 811. The echo signal $y_2(n)$ from echo path 808 is combined with v(n) by adder 818, and the combined signal is transmitted to the FXO switch where it is further combined with echo signal $y_1(n)$ by adder 812. Finally, v(n) together with polluting echo signals $s_1(n)$ and $s_2(n)$ is transmitted as output 820, where it may be heard by the caller.

Figure 9:
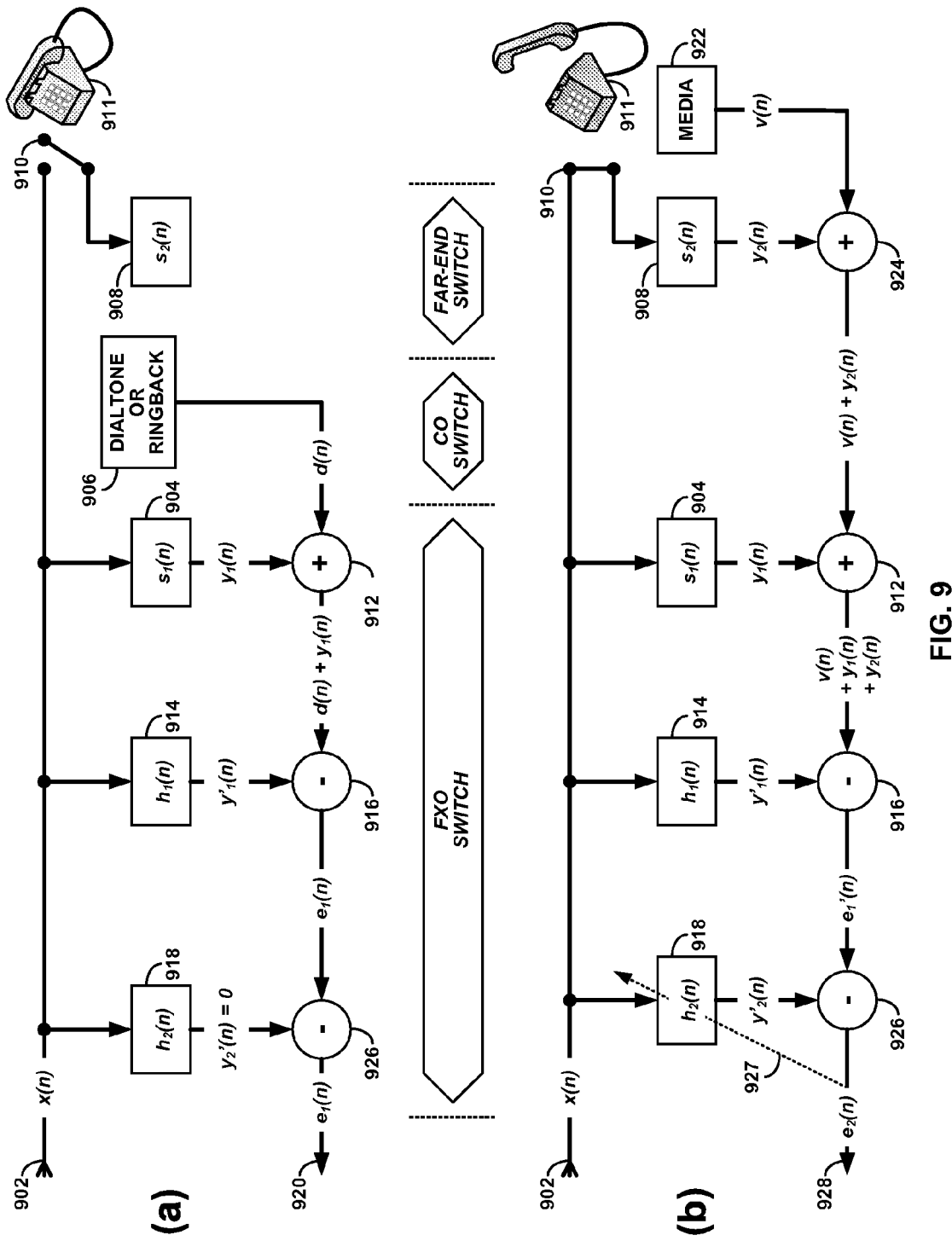
FIG. 9 illustrates in simplified form signal paths in an embodiment of a method and system for cancelling echo from two echo sources in the same signal path.

An exemplary embodiment of the present invention for the case of two echo cancellers is shown in FIG. 9. Again, by way of example, a call is placed from a phone connected to the FXO networks switch. The inputs, echo paths, and echo signals are the same as those depicted in FIG. 8, but in the embodiment illustrated in FIG. 9, echo cancellers 914 and 918 with adaptive digital filters $h_1(n)$ and $h_2(n)$, respectively, are incorporated in the FXO switch. The subscripts signify the first and second echo paths as in FIG. 8, as well as now the first and second echo cancellers, respectively. During phase 1, shown at the top of FIG. 9 (labeled "(a)"), echo canceller 914 operates to cancel echo from echo path 904. Preferably, the output of adaptive filter 914, $y_1'(n)$, is subtracted from the combination of d(n) and $y_1(n)$ by differencer 916 to yield $e_1(n)$, as indicated. Here, $e_1(n)$ corresponds to the difference between $y_1(n)$ and $y_1'(n)$, plus signal d(n), as explained in connection with FIG. 5, for example. Thus $e_1(n)$ corresponds to d(n) combined with any residual echo signal left from imperfect cancellation of $y_1(n)$.

Also during phase 1, adaptive filter $h_2(n)$ operates with initial coefficients that cause it to yield no signal. That is, during phase 1, $y_2(n)$ is not present and $y_2'(n)$ is zero. Consequently, the echo canceller associated with $h_2(n)$ has no effect on input signal $e_1(n)$, as indicated in the figure.

During phase 2, shown at the bottom of FIG. 9 (labeled "(b)"), when echo signal $y_2(n)$ is introduced in the return path and v(n) from phone 811 replaces d(n), echo canceller 918 operates to cancel echo from echo path 908. Preferably, the output of adaptive filter 918, $y_2'(n)$, is subtracted from the input signal $e_1'(n)$ at differencer 918 to yield output $e_2(n)$. In general, $e_1'(n)$ is the combination of v(n), $y_1(n)-y_1'(n)$, and $y_2(n)$. However, $y_1(n)-y_1'(n) \approx 0$, and during instances when the far-end side is silent (i.e., when v(n)=0), $e_1'(n)$ is just $y_2(n)$. During such instances, $h_2(n)$ may train to generate $y_2'(n)$ that cancels the far-end echo signal $y_2(n)$, as indicated by line 927. With error signals $y_2(n)-y_2'(n)$ rendered as small as possible, for example through convergence of the adaptive filter $h_2(n)$, the output 928 will be v(n) free (or nearly free) any echo.

Note that if a call is placed from the far-end side, phase 1 will be skipped and the call will begin in phase 2. Operation of the two (or more) echo cancellers according to the preferred embodiment will not be altered, except that $h_2(n)$ will begin training as soon as the call begins (and during instances of silence from the far-end). Discussion of the present invention in the context of a call placed from the FXO side of the call is for illustrative purposes, in order to conceptually distinguish operation of the two (or more) echo cancellers.

As with the single digital echo canceller described in connection with the discussion of FIG. 5, practical embodiments of this double digital echo cancellation method and system may be realized using one or more digital signal processors (DSPs) or DSP-based system, although, again, other means are possible as well. In an exemplary embodiment, a DSP or DSP system could include, without limitation, machine language instructions executable to carry out the functions described in the preceding discussion of FIG. 9. Note that while adders 912 and 924 are distinguished as explicit elements in the figure, they may simply be connection junctions in which two input signals are combined into a single output signal (and further note that action of adder 924 is carried out in the far-end switch). Similarly, differencers 916 and 926 could just be adding junctions in which one of the two inputs is rendered negative prior to adding. Also, while each error signal has been described as the output of an adaptive filter subtracted from the input signal to the corresponding echo canceller, either or both error signals could be computed according to the opposite algebraic sign. Finally, this preferred embodiment has been described in exemplary form as being two echo cancellers incorporated in an FXO switch, but it should be understood that the method and system of the present invention could be incorporated in any type of network switch or routing device that is in the path of multiple echo signals, and further, could include more than two echo cancellers. The method and system could even be implemented in a packet phone, such as a SIP-based phone in a network attached to an FXO or other VoIP gateway device.

Exemplary Operation of Multiple Echo Cancellers in an FXO Network Switch

As explained above, the activation of operation of each of the two (or possibly more) echo cancellers of the present invention is preferably carried out according to the presence of the particular echo signal to which the each respective echo canceller is targeted. That is, activation of operation of each echo canceller is conditioned on the presence of the associated echo targeted for cancellation.

Figure 10:
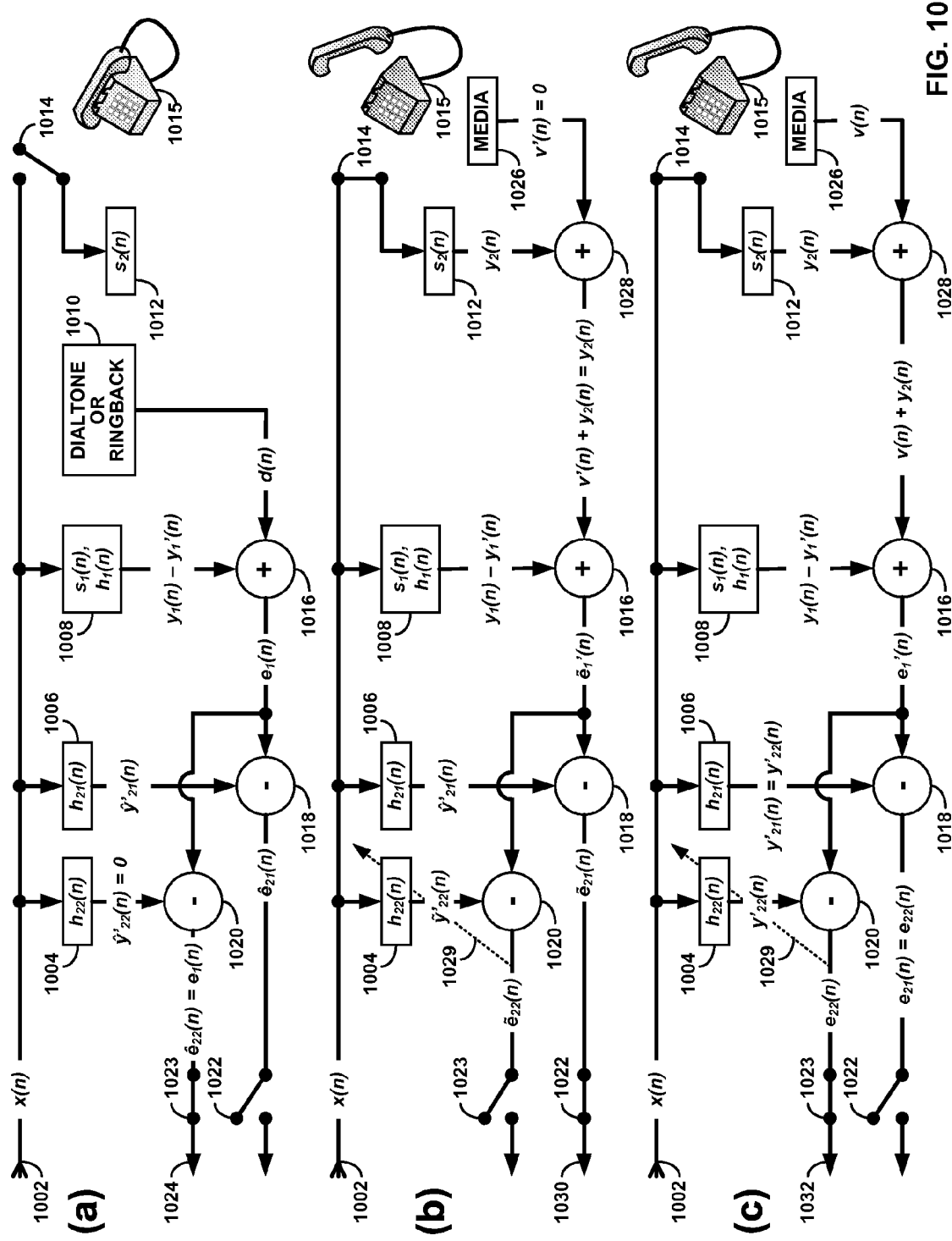
FIG. 10 illustrates an embodiment of a method and system for cancelling echo from two echo sources in the same signal path.

A preferred embodiment of such conditional activation of operation is illustrated in FIG. 10, which shows establishment of echo cancellation separated conceptually into three phases labeled "(a)," "(b)," and "(c)" at the top, middle, and bottom, respectively, of the figure. For purposes of this discussion, these phases are designated as phase 1, phase 2-1, and phase 2-2. Phase 1 corresponds to the first phase of call setup discussed in connection with FIGS. 8 and 9 above. Phases 2-1 and 2-2 correspond to the second phase discussed above, but represent two sub-phases during which two different sub-component echo cancellers of a second echo canceller are coordinated in order to cancel echo from the far-end switch.

In this discussion, the two sub-component echo cancellers are referred to as sub-component echo canceller 2,1 and sub-component echo canceller 2,2, signifying, respectively, second echo canceller, first sub-component, and second echo canceller, second sub-component. (Note that the terminology "2-1" and "2-2," which applies to the sub-phases of phase 1, should not be confused with the terminology "2,1" and "2,2" that applies to the two sub-component echo cancellers of the second echo canceller. As described below, each of the two sub-component echo cancellers have functions during both of the sub-phases, for example.) Both sub-phases apply to a call phase that begins when the called party answers the call, but in the first sub-phase, sub-component echo canceller 2,1, initially operating according to filter coefficients determined for a previous call, provides the system output, while sub-component echo canceller 2,2 is concurrently trained according to $s_2(n)$ in the current call. In the second sub-phase, sub-component echo canceller 2,2 provides the system output, and the newly-determined filter coefficients replace what had at the start of the current call been previous filter coefficients for sub-component echo canceller 2,1. Also during the second sub-phase, training of sub-component echo canceller 2,2 may be carried out during instances of silence from the far-end side of the call, as explained in the discussions of FIGS. 5 and 9 above, for example.

In FIG. 10, the locations along the signal path of the various elements and functions are the same as in FIGS. 8 and 9, but for the sake of brevity, the designations of FXO switch, CO switch, and far-end switch have been omitted. Additionally, the explicit depictions in FIG. 9 of echo path 904 (with impulse response $s_1(n)$) and echo canceller 914 (with filter $h_1(n)$) have been logically combined in FIG. 10 as element 1008, again for the sake of brevity in the figure. That is, element 1008 represents both the echo signal $y_1(n)$ and filter output $y_1'(n)$, as well as their difference, as indicated. As before, the subscript signifies to the first echo path and first echo canceller. Further, in a preferred embodiment, the characteristics of the FXO echo path ($s_1(n)$ in FIG. 9, for example) are the same for all calls since the FXO is always connected to the same CO switch (the characteristics may be updated or modified from time to time due to system configuration changes, system maintenance operations, or other non-call-related actions, for instance, but such changes are infrequent compared to routinely placed and received calls).

During phase 1 (top of FIG. 10), dial tone or ringback 1010 are transmitted by the CO switch as d(n), and combined with residual echo signal $y_1(n)-y_1'(n)$ by adder 1016, yielding $e_1(n)$. As indicated by open connection 1014, the call has not yet been answered. FXO error signal $e_1(n)$ is combined with the filter outputs of both sub-component echo cancellers. The adaptive filters 1006, 1004 for the two sub-component echo cancellers are designated $h_{21}(n)$ and $h_{22}(n)$, respectively, and during phase 1 the outputs of each (based on input signal x(n)) are designated $\hat{y}_{21}'(n)$ and $\hat{y}_{22}'(n)$. Here, the subscript "21" signifies the second echo canceller, first sub-component echo canceller, and the subscript "22" signifies the second echo canceller, second sub sub-component echo canceller.

At the start of phase 1, the coefficients of $h_{22}(n)$ are initialized such that the output of adaptive filter 1004 (i.e., $\hat{y}_{22}'(n)$) is zero (or nearly zero), and consequently the initial error signal of sub-component echo canceller 2,2 is $\hat{e}_{22}(n)=e_1(n)$, the same as the input. As indicated by closed connection 1023, $e_1(n)$ is sent to output 1024. This is the same result as described for phase 1 in connection with FIG. 9. Also during phase 1, the coefficients of $h_{21}(n)$ are those set for a previous call, so the initial output $\hat{y}_{21}'(n)$ may be different from zero. Consequently, when this output is subtracted from $e_1(n)$, the initial error signal $\hat{e}_{21}(n)$ of sub-component echo canceller 2,1 may include extraneous signal. Therefore output of sub-component echo canceller 2,1 is not output by the system, as indicated by open connection 1022.

Phase 2 begins with the start of sub-phase 2-1 (middle of FIG. 10), which occurs when phone 1015 go off-hook and a connection is made, as indicated by closed connection 1014. At this point, dial tone and/or ringback cease, and echo path 1012 in the far-end switch is introduced into the signal path, yielding echo signal $y_2(n)$. A media path for media data 1026 becomes active, but there may be one or more silence intervals in sub-phase 2-1 during which the transmitted signal corresponds to silence (or near-silence); the far-end signal for these intervals is designated as v'(n), where v'(n)≈0. Thus during intervals of far-end silence, FXO error signal $\tilde{e}_1(n) \approx y_2(n)$, and adaptive filter $h_{22}(n)$ may therefore train on the pure echo signal $y_2(n)$, as indicated by feedback line 1029.

During the training process of adaptive filter 1004 in phase 2-1, the filter output is $\tilde{y}_{22}'(n)$ and the resulting error signal of sub-component echo canceller 2,2 is $\tilde{e}_{22}(n)$, signifying pre-convergence. In this brief period before $y_2(n)$ is properly cancelled, the error signal $\tilde{e}_{21}(n)$ of sub-component echo canceller 2,1 using its previous coefficients may initially yield a better approximation of echo cancellation than sub-component echo canceller 2,2 with pre-convergence coefficients. That is, the previous coefficients ($h_{21}(n)$) may yield a better initial estimate of echo cancellation than the under-adjustment new ones ($h_{22}(n)$) at the start of sub-phase 2-1. Thus connection 1023 is open and 1022 is closed, so that echo cancellation using sub-component echo canceller 2,1 with previous coefficients is sent to output 1030.

Preferably, the determination as to which of the sub-component echo cancellers' output signals should be output from the system will be made by continuously comparing their outputs and selecting the one with the smallest error signal. In an exemplary embodiment, this comparison may be made by comparing time averages of the power associated with each error signal, where the time averages of each are computed over the same time windows. The time averages may additionally or alternatively be compared with a threshold value, such that when their difference passes the threshold, the selection of which sub-component echo canceller to output is responsively interchanged. Note that the process of comparing time averages of the power associated with the error signals is not indicated in by any element in FIG. 10, although the result of the comparison will preferably be used to determine which of connections 1022 and 1023 to close or open, for example.

Once adaptive filter 1004 ($h_{22}(n)$) converges, the sub-component echo canceller 2,2 may then be selected. At this point, sub-phase 2-1 ends and sub-phase 2-2 begins (bottom of FIG. 10). The converged output of $h_{22}'(n)$ during sub-phase 2-2 is $y_{22}'(n)$ and the resulting error signal is $e_{22}(n)$, as indicated. Further, media data 1026 may now correspond to actual voice or other non-silence data, as indicated by the designation v(n), although intervals of far-end silence are still possible. As discussed above, continual training of $h_{22}(n)$ may be carried out during sub-phase 2-2, subject to the condition that it does not yield degraded echo cancellation. That is, $h_{22}(n)$ may be trained during intervals of far-end silence, but when the far-end is not silent, training will preferably be frozen, responsive to a degradation of $e_{22}(n)$.

Also in sub-phase 2-2, connection 1023 is closed, so that the output of sub-component echo canceller 2,2 is sent to output 1032, while connection 1022 is opened so as discontinue output 1030 from the system. While it is not required that the sub-component echo canceller 2,2 be selected during sub-phase 2-2, it is likely that the continual training of filter $h_{22}(n)$ with new coefficients will yield a better result than $h_{21}(n)$ using previous coefficients. In any case, the selection will preferably be determined according to the comparison of the time averages of the two error signals, as described above.

Following convergence of $h_{22}(n)$ at the end of sub-phase 2-1, and after any subsequent training of $h_{22}(n)$ that yields improved (or at least unchanged) performance of sub-component echo canceller 2,2, the newly determined coefficients are then applied (e.g., copied) to $h_{21}(n)$. In this way, the best coefficients for the current call may become previous coefficients for the next call.

In accordance with this preferred embodiment, in a system including multiple echo cancellers, the conditional operation of any given echo canceller may be implemented through sub-component echo cancellers, wherein one of the sub-component echo cancellers begins operation with initialized coefficients that effectively yield no echo cancellation, as just described. This method and system may be extended to systems that include two or more echo cancellers. Again, the exemplary operation described according to FIG. 10 does not require that a call be placed from the FXO side. In particular, for a call placed from the far-end switch side, phase 1 is skipped, and the call begins with sub-phase 2-1. In this case, sub-component echo canceller 2,1 may be selected initially, either by design of the logic, or by comparing the error signals of both sub-component echo cancellers.

As with the other embodiments of echo cancellation described above in connection with FIGS. 5 and 9, the method and system exemplified in FIG. 10 will preferably be implemented in a DSP or DSP-based system (although implementation as an analog signal processing system using active and passive circuit elements is possible as well). Again, such a device or system could include, without limitation, machine language instructions executable to carry out the functions described in the preceding discussion of FIG. 10. Further, the comments made in connection with the adder and differencer elements in FIG. 9 apply to the analogous elements in FIG. 10. Additionally, the elements in FIG. 10 referred to as connections 1022 and 1023 may be logical signal routing elements in the DSP device or DSP-based system. That is, in the context of the discussion of FIG. 10, they are logical elements representing selections of one or another of the sub-component echo cancellers as system output. It would be readily understood by one of ordinary skill in the art that are numerous ways to realize the functions associated with connections 1022 and 1023.

The embodiment discussed in connection with FIG. 10 is illustrated as a flowchart in FIG. 11 for the general case of a call either placed from the FXO side or from the far-end switch side. In the following discussion, the distinction between sub-phases is inherent in the logical steps, so the terminology of phase 1, sub-phase 2-1, and sub-phase 2-2 is dropped in favor of reference to just phase 1 and phase 2. In view of the discussion above, a call placed from a phone in a network connected to the FXO will begin in phase 1, during which only FXO echo is present, and will then enter phase 2 when the call is answered at the far end, at which point far-end switch echo will (possibly) also become present. In contrast, a call placed from the far-end will begin in phase 2, in which case both FXO echo and far-end switch echo will be present from the start. As noted above, the exemplary call described in connection with FIG. 10 is placed from a phone in a network connected to the FXO for illustrative purposes, in order help clearly separate the conceptual phases discussed. The flowchart of FIG. 11 applies to calls originating on either side of the FXO network switch.

At step S-12, an off-hook condition at the FXO switch causes the FXO echo path to be introduced into the signal path. If the call is originated from the far end, then echo from the far-end switch may also be introduced into the signal path. The off-hook condition in step S-12 is not tied to which side originates the call.

Since the FXO echo path will be present in all calls, the FXO echo canceller (with adaptive filter $h_1(n)$) becomes active upon the off-hook condition, as indicated at step S-14. At step S-16, sub-component echo canceller 2,1 with adaptive filter $h_{21}(n)$ is operational employing the last set of coefficients used by the filter (e.g., from the end of a previous call), and at step S-18, sub-component echo canceller 2,2 with adaptive filter $h_{22}(n)$ is operational using initialized coefficients that yield effectively zero cancellation. Note that the designations of the sub-component echo cancellers in FIG. 11 are the same as those used in the discussion of FIG. 10.

As indicated in step S-18, if the call beings in phase 1 (e.g., the call is placed from a phone in a network connected to the FXO switch), then the error signal of sub-component echo canceller 2,2 is selected as system output. That is, since only FXO echo is present during phase 1, the initialized coefficients applied to $h_{22}(n)$ do not affect the FXO echo cancellation of $h_1(n)$, whereas the $h_{21}(n)$ with its previous coefficients applied attempts to cancel non-existent far-end echo, resulting in a distorted output signal. If the call does not begin in phase 1 (i.e., it begins in phase 2), then the choice between sub-component echo cancellers 2,1 and 2,2 is determined by comparing their respective error signals, as described below, or by a pre-defined choice executed in program logic.

Determination of whether a call begins in phase 1 or phase 2 may be accomplished in a number of ways. Preferably the FXO network switch will include elements that detect the presence or absence of dial tone or other DTMF tones, as well as ringback. Such elements could include, without limitation, digital filters and analog filters. If dial tone or ringback, for instance, are detected under the off-hook condition, then the off-hook condition may be considered as phase 1 of a call. If no such tones or signals are detected under the off-hook condition, and if the input from the CO switch is above a preset threshold, then the off-hook condition may be considered as phase 2 of a call.

At step S-20, sub-component echo canceller 2,2 begins training on the input signal, and as indicated, training will continue as long as the resulting error signal (e.g., $\tilde{e}_{22}(n)$ in FIG. 10) improves (or at least does not deteriorate). That is, if updating the current coefficients for $h_{22}(n)$ would decrease the power of the output error signal, then the training continues and the current coefficients are replaced with the updated values, but if updating the current coefficients would increase the power of the output error signal, then the training is frozen and the current coefficients left unchanged. For example, during phase 1 the FXO error signal will include dial tone or ringback, and training of sub-component echo canceller 2,2 preferably will freeze since the presence of dial tone or ringback will cause $h_{22}(n)$ to diverge instead of converge. Similarly, during the transmission of any far-end signal during phase 2 (e.g., voice data from the far end), training will also preferably be frozen. However, during instances of silence from the far-end in phase 2, training of sub-component echo canceller 2,2 may yield an improved output (reduced error signal), so training will preferably proceed. Under the condition that training is frozen, it may be resumed if a new set of coefficients, determined according to the feedback of the current error signal, would again yield decreasing error signal.

The freezing of training of sub-component echo canceller 2,2 may be accomplished in a variety of ways. In a preferred embodiment, two sets of coefficients are maintained for filter $h_{22}(n)$. The first set, referred to as the current set, corresponds to the coefficients used to yield the current output error signal. The second set, referred to as the dynamic set, corresponds to a new set determined according to feedback from the current output error signal. Applying the dynamic set to sub-component echo canceller 2,2 would yield an updated error signal. By comparing the updated error signal to the current error signal, the echo canceller can determine if the dynamic set should replace the current set. If the dynamic set yields an improvement, then it replaces the current set; if not, then it is ignored or discarded, and training is effectively frozen. Note with this approach, feedback of the current error signal and testing of the dynamic set of coefficients is carried out continuously, and freezing amounts to leaving the current coefficients unchanged. Other methods of freezing training of sub-component echo canceller 2,2 may also be used, and the present invention is not limited by the particular method employed.

At steps S-22 and S-24, the time averages of the outputs of sub-component echo cancellers 2,1 and 2,2, respectively, are computed. The time averages are referred to in FIG. 11 as <E21> and <E22>, respectively. Each time average is computed over the same time window, and each preferably corresponds to a time-average of the power associated with the respective error signal in the time window, as discussed above. At step S-26, the two computed time averages are compared, and the subsequent steps are conditioned on the result of the comparison.

If <E22> is smaller than <E21>, then the error signal of sub-component echo canceller 2,2 is selected as system output, as indicated at step S-28. Further, if the error signal of sub-component echo canceller 2,1 had been the output up to this point, it is now de-selected. Then at step S-30, the current coefficients of $h_{22}(n)$ are copied to $h_{21}(n)$ if training of sub-component echo canceller 2,2 is not frozen. That is, if sub-component echo canceller 2,2 is training and improving, then its coefficients are copied to sub-component echo canceller 2,1. However, if training is frozen the coefficients are not copied. For example, during phase 1 (i.e., for calls that begin in phase 1), sub-component echo canceller 2,2 will be selected initially, but as discussed above its training will be frozen. Consequently, the coefficients of $h_{22}(n)$ will not be copied to $h_{21}(n)$ during phase 1. Similarly, they will not be copied any time they would yield a degraded result, since training is frozen if the output error signal would increase. In this way, sub-component echo canceller 2,1 will always have coefficients that correspond either the best current values of the current call, or the best final values of a previous call.

Following step 30 (with <E22> smaller than <E21>), the process either repeats from step S-20 if the call is still in progress, or completes with the end of the call at step S-36. The determination of which of these two steps to choose is made at step S-34 according to whether or not an on-hook condition is detected. It should be understood that the determination could be made in other ways.

Returning to step S-26, if <E22> is larger than <E21>, then the error signal of sub-component echo canceller 2,1 is selected as system output, as indicated at step S-32. This may occur, for instance, when a call transitions from phase 1 to phase 2. At this instant, far-end echo may be introduced into the signal path, and the output error signal of sub-component echo canceller 2,2 may suddenly increase. Since training of sub-component echo canceller 2,2 is frozen during phase 1, its coefficients are not copied to sub-component echo canceller 2,1 and thus at the transition from phase 1 to phase 2, $h_{21}(n)$ still retains its best final coefficients from the end of a previous call, as explained above. Under this condition, $h_{21}(n)$ with previous coefficients may be a better estimate of far-end echo than $h_{22}(n)$ with initialized (and frozen) coefficients, and thus sub-component echo canceller 2,1 may yield a smaller error signal (i.e., <E21> smaller than <E22>), at least at the start of phase 2. As noted, once phase 2 begins, training of sub-component echo canceller 2,2 may resume (during instances of far-end silence) and thus sub-component echo canceller 2,2 will eventually converge and be selected over sub-component echo canceller 2,1.

Following step 32 (with <E22> larger than <E21>), the process either repeats from step S-20 if the call is still in progress, or completes with the end of the call at step S-36. Again, the determination of which of these two steps to choose is made at step S-34 according to whether or not an on-hook condition is detected. This sequence of steps is the same as the one that follows step S-30, described above.

Figure 11:
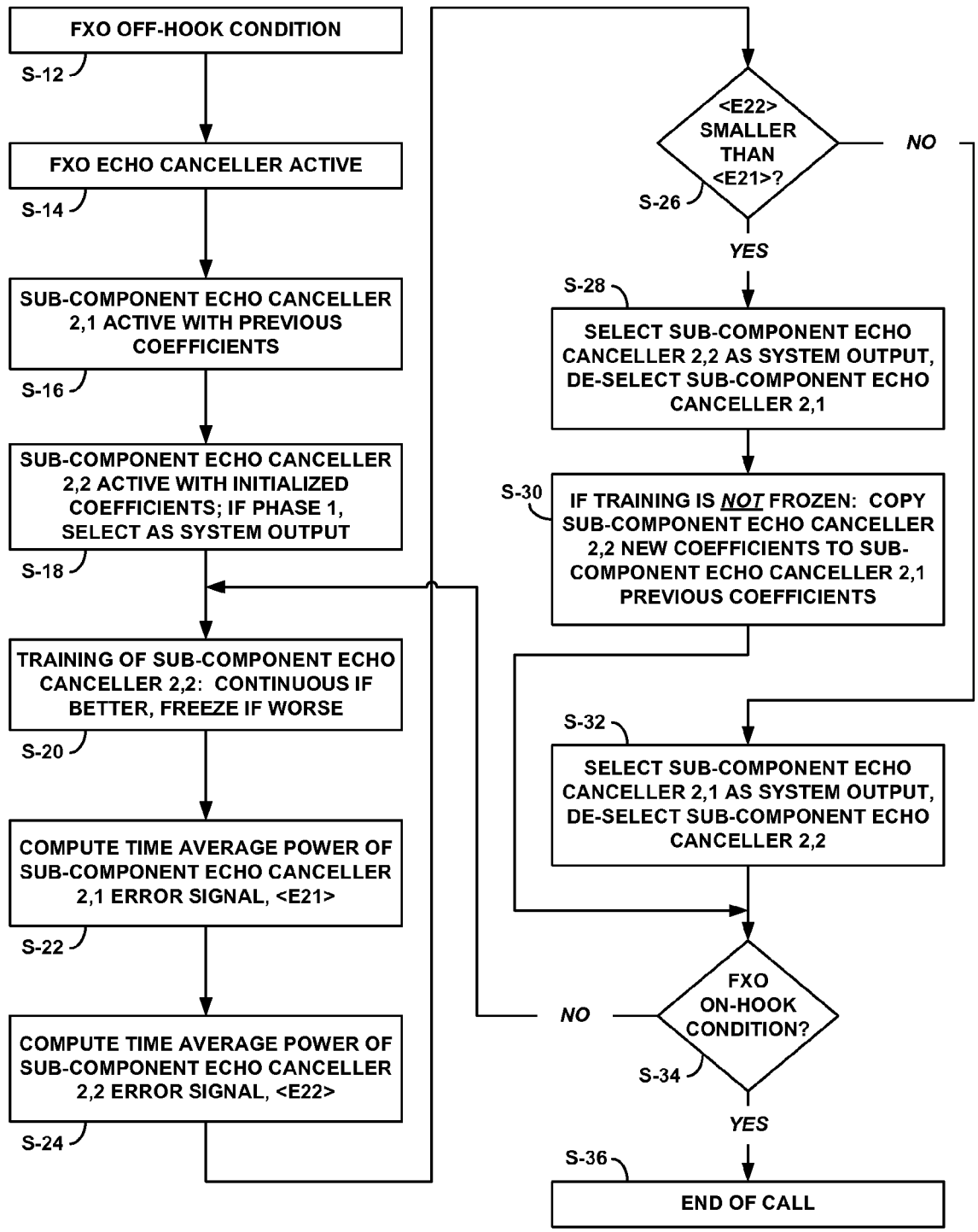
FIG. 11 is a flowchart illustrating operation of a method and system for cancelling echo from two echo sources in the same signal path.

It should be understood that the flowchart of FIG. 11 is exemplary, and additional or alternative steps could be included without limiting the scope or spirit of the present invention. For example, the determination not to copy the coefficients of $h_{22}(n)$ to $h_{21}(n)$ could be made responsive to a determination that the call is in phase 1, instead of or in addition to the determination that training is currently frozen. As another alternative, upon determination that a call has begun in phase 2 (i.e., a call placed from the far-end side), sub-component echo canceller 2,1 could be selected immediately as a matter or pre-defined program execution, rather than through the comparison of output error signals. Other examples of alternative steps are possible as well.

Exemplary Training of an Echo Canceller for an Internal Echo Path

As mentioned in the discussion of FIG. 10, the FXO connection to the CO switch is relatively static, so that the characterization $s_1(n)$ of the FXO echo path is generally fixed from one call to the next. For instance, an FXO network switch (or similar device) may be deployed by a business or enterprise to provide a VoIP network with connectivity to the PSTN by way of one or more analog lines to a local CO switch. In such a deployment, the one or more analog lines are preferably part of a relatively static configuration (i.e., one that changes only rarely, if ever, in comparison to the frequency of calls placed from and received by phones in the VoIP network). Consequently, training of the echo canceller targeted at echo signal $y_1(n)$ may need to be carried out only once, or at least infrequently compared to the frequency of calls. For example, adaptive filter $h_1(n)$ may be trained (e.g., via convergence) when the FXO network switch (or similar device) is first connected to the CO switch and made operational (e.g., booted up). Thereafter, only infrequent calibration checks and adjustments may be necessary, but the associated echo canceller settings (e.g., coefficients) may otherwise remain fixed from call to call. In contrast, the echo canceller (including sub-component echo cancellers) targeted at echo signal from the far-end switch may require training on each call, as discussed above, for instance.

Preferably, a method similar to that described in connection with the discussion of digital echo cancellation (illustrated in FIG. 5) may be applied to the echo path associated with $s_1(n)$ and echo signal $y_1(n)$. In particular, the echo of an input signal may be used to train $h_1(n)$ in the absence of any input from the CO switch. A difficulty may arise with this approach, however, because in order to introduce the echo path associated with $s_1(n)$, an active analog connection to the CO switch must be established, for example by a VoIP phone going off-hook. As described above, the CO switch will respond by playing dial tone toward the FXO network switch (or similar device). As a consequence, the echo signal $y_1(n)$ will be mixed with dial tone, and proper training of adaptive filter $h_1(n)$ will not be possible. In further accordance with a preferred embodiment of the present invention, two methods may be employed to train filter $h_1(n)$ under the circumstance that dial tone or other signal from the CO switch (or similar device) is mixed with the echo signal $y_1(n)$. Each method is described below.

The methods are preferably applied when an FXO network switch (or similar device) is first connected by analog lines to a CO switch and made operational, and may be applied from time to time thereafter as necessary for recalibration, for example. Both methods are aimed at removing dial tone or other signal that is transmitted from the CO switch responsive to establishing an active circuit connection made to the switch, for example by going off-hook at the FXO end. Once dial tone or other signal is removed, $h_1(n)$ may be trained according to the pure echo signal $y_1(n)$; i.e., $y_1(n)$ without any contribution from dial tone (or other signal) from the CO switch.

In the first method, after activation of the analog circuit connection (e.g., off-hook condition), a signal is sent from the FXO network switch to the CO switch that causes the CO switch to responsively cease playing dial tone (or other signal). Preferably, the signal from the FXO network switch to the CO switch comprises one or more DTMF tones. For example, certain CO switches expect (or require) a particular DTMF tone (e.g., the tone associated with the "1" digit) in order to then accept additional tones that make up a dialed phone number. Upon receiving the particular DTMF tone, the CO switch will, as part of normal operation, cease playing dial tone. Thus, by sending the particular DTMF tone, the FXO can cause the CO switch to cease playing dial tone, at which point $h_1(n)$ may then be trained according to the pure echo signal $y_1(n)$ as described, for example, in the discussion above of FIG. 5.

In the second method, after activation of the analog circuit connection (e.g., off-hook condition), the FXO introduces a filter at certain points in the signal path that effectively removes dial tone (or other signal) played out from the CO switch. The filter eliminates (or at least suppresses) frequency components of the dial tone (or other signal), leaving pure (or nearly pure) echo signal according to which the echo canceller may train. Such a filter is sometimes referred to as notch filter or a removal filter.

The removal filter may be constructed either according to known frequency components of the dial tone signal played by the CO switch, or from an ancillary filter adapted according to a scaled version of the dial tone signal. Depending on the particular CO switch to which the FXO connects, the dial tone may comprise a combination of one or more standard frequencies. In this case, the removal filter may be constructed according to the known frequencies. However, the FXO may be connected to a private switch that uses a non-standard dial tone, or to a CO switch that uses non-standard frequencies for dial tone. If the dial tone frequencies are not known ahead of time, then an ancillary filter will preferably be determined and used to construct the removal filter.

Figure 12:
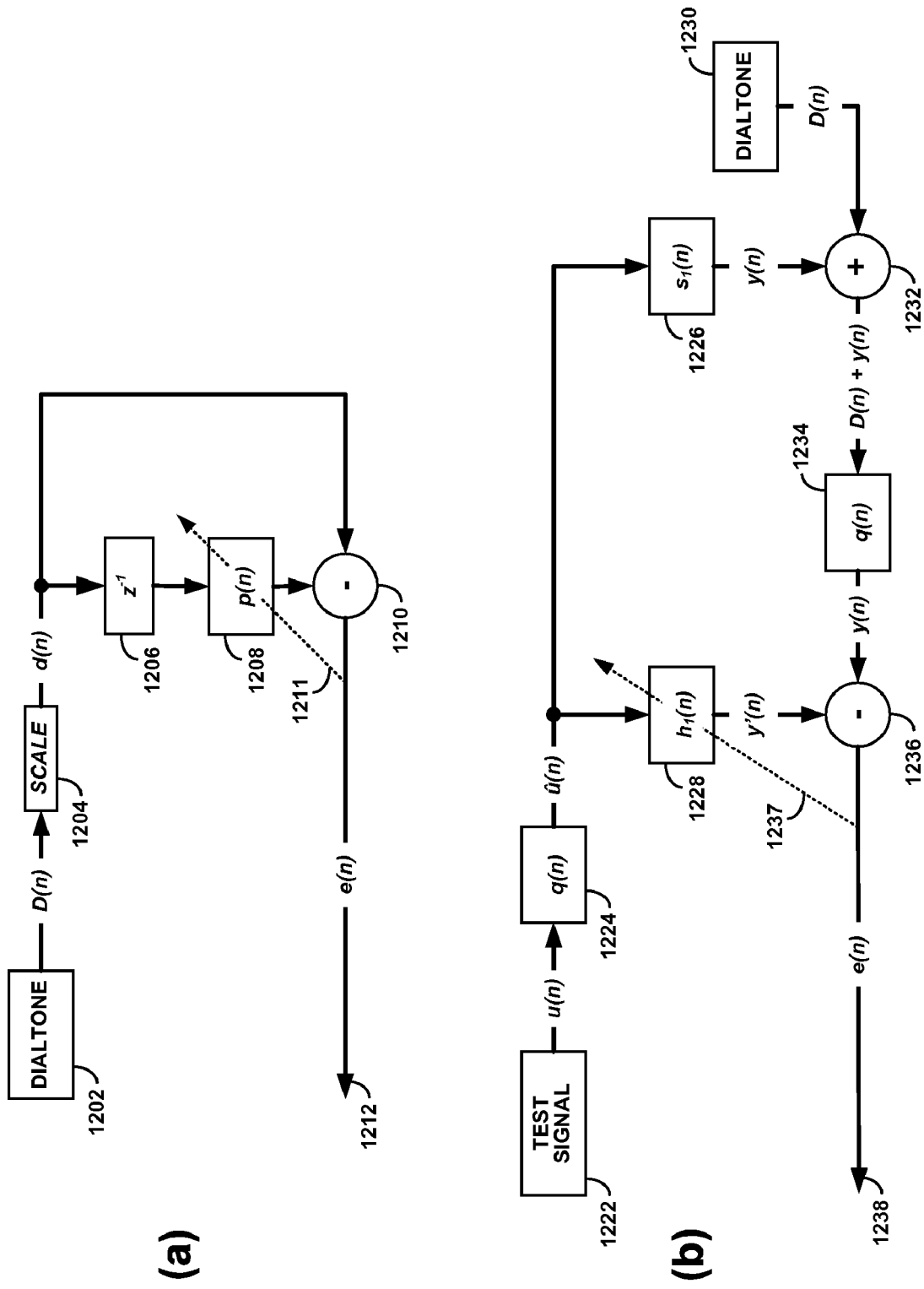
FIG. 12 illustrates in simplified form a method and system for echo cancellation of an echo signal that is combined with a persistent, non-echo signal.

FIG. 12 illustrates how the ancillary filter is determined, as well as how the removal filter, once constructed by either approach, is applied in the process of training the echo canceller filter. At the top of the figure (labeled "(a)") ancillary digital filter p(n) is applied to a time-delayed input signal, and the output subtracted from the non-delayed input signal. Feedback of the resultant error signal is used to adjust the filter so as to minimize the error signal. The input signal originates as dial tone 1202 signal D(n), and is scaled to a standard output level by scale element 1204. The scaled signal d(n) is then time-delayed by one sample by delay $z^{-1}$ 1206, and the delayed signal is input to adaptive filter p(n) 1208. The output of p(n) is subtracted from the non-delayed signal d(n) by differencer 1210, yielding error signal e(n). The error signal is fed back to p(n), as indicated by line 1211, and p(n) is adjusted to achieve a minimum error signal. The result is a set of k filter coefficients, where k is an integer corresponding to a number of samples sufficient to achieve a properly trained ancillary filter. Typical values for k range from 128 to 256, although other values are possible. With p(n) determined in this manner, an effective removal filter, q(n), may be constructed according to filter coefficients {1, p(n)}. That is, q(n) contains k+1 coefficients, where the first coefficient is equal to one, and the next k coefficients correspond to the coefficients of p(n).

At the bottom of FIG. 12 (labeled "(b)"), the removal filter is applied in accordance with a preferred embodiment of the present invention. With an active analog circuit connection to the CO switch and resultant dial tone (or other signal) playing from the CO switch to the FXO network switch (or similar device), a test signal 1222, designated as u(n), is transmitted from the FXO toward the CO switch. The test signal may be white noise, for instance, although other forms of test signal may be used. The test signal is input to first removal filter 1224 characterized by q(n), which then yields modified test signal û(n), as indicated. The modified test signal is input to adaptive filter 1228 characterized by $h_1(n)$, and is also reflected back as echo signal y(n) by echo path 1226 in the FXO network switch (or similar device) with impulse response $s_1(n)$. The echo signal is mixed with dial tone D(n) from the CO switch, and the combined signal is then input to second removal filter 1234, also characterized by q(n). The output of $h_1(n)$ is subtract from the output of second removal filter 1234 while $h_1(n)$ is being adjusted according to error signal e(n), as indicated by line 1237. The adjustment yields a trained (or converged) filter $h_1(n)$. Note that q(n) may be constructed by either of the methods described above (known frequency components of D(n), or ancillary filter determination).

In accordance with the preferred embodiment, $h_1(n)$ determined in this manner yields echo cancellation of reflected signal arising from the echo path in the FXO network switch (or similar device). As discussed above, the characteristics of $h_1(n)$ need only be established when the FXO system is first configured with the CO switch and made operational, and possibly for relatively infrequent recalibrations or adjustments thereafter. Since all calls place or received via the FXO network switch (or similar device) include the FXO echo path (with impulse response $s_1(n)$), the echo canceller for this echo path will preferably be operable for all calls, but without the need to retrain on each call. In contrast, the echo canceller for far-end echo may retrain for each call, for example as described in connection with the discussion of FIG. 10.

Exemplary Operation of Two Echo Cancellers in a Network Switch

Figure 13:
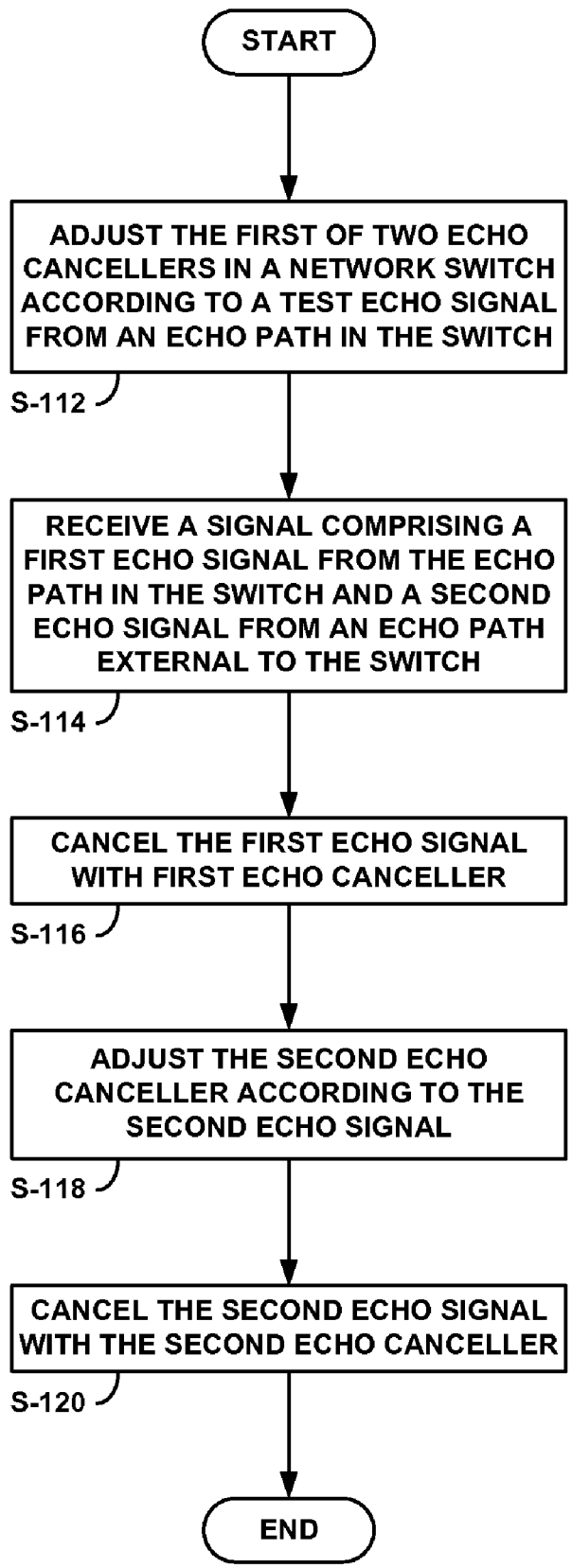
FIG. 13 is a flowchart illustrating operation of two echo cancellers in a network switch.

Exemplary operation of two echo cancellers in a network switch is illustrated as a flowchart in FIG. 13. At step S-112, the first of two echo cancellers in the network switch is adjusted according to a test echo signal that is received from a first echo path located in the switch. For instance, the first echo path could originate in a two-to-four wire hybrid in the network switch. The adjusting step could be carried out when the network switch is initially connected to a local CO switch, as described above.

As an example, initial setup of the network switch could include establishing an analog loop circuit connection to the CO switch (e.g. by going off hook). Dial tone from the CO could then be removed at the network switch either by sending a DTMF tone that causes the CO switch to stop transmitting the dial tone, or the network switch applying a removal filter to the incoming connection. With dial tone removed, a test signal, such as white noise, could then be transmitted from the network switch to the CO switch. Echo of the test signal generated on the echo path in the network switch then comprises the test echo signal, which may be cancelled by adjusting an adaptive filter in the first echo canceller, as discussed above. Once the first echo canceller is adjusted, it may require little or no additional adjustment for subsequent calls.

At step S-114, a signal comprising a first echo signal and a second echo signal is received at the network switch. For example, the signal may correspond to voice media transmitted from the network switch during a call. The first echo signal would then correspond to echo of the voice media generated by the first echo path in the network switch, and the second echo signal could correspond to echo of the voice media generated in an echo path that is external to the network switch. For instance, the second echo path may be located in a two-to-four wire hybrid in a far-end switch.

The first echo signal may be removed by the first echo canceller, as indicated at step S-116. Since the first echo canceller was adjusted according to the test echo signal at step S-112, cancellation of the first echo signal may proceed without further adjustment of the first echo canceller. However, the second echo signal may be different on a call by call basis since a different far-end switch could be involved in each new call. Thus, the second echo canceller, which may be used to cancel the second echo signal, must first be trained according to the second echo signal, as indicated at step S-118.

Following adjustment of the second echo canceller, the second echo signal is cancelled by the second echo canceller at step S-120. As described above, the steps of adjusting the second echo canceller according to the second echo signal and then cancelling the second echo signal may involve two sub-component echo cancellers. In a preferred embodiment, the first sub-component echo canceller may yield initial echo cancellation at the start of a call, using settings or digital coefficients of a previous call. At the same time, the second sub-component echo canceller may train on the second echo signal in order to achieve optimized echo cancellation. Once the second sub-component echo canceller is trained, then its settings may be transferred or copied to the first sub-component echo canceller. In this way, the second sub-component echo canceller may continually train on the second echo signal, while the first sub-component echo canceller may retain the latest, best settings or digital coefficients.

It should be understood that the steps described above are illustrative, and that other additional and/or alternative steps may be carried out in order to advantageously accomplish cancellation of two combined echo signals using two echo cancellers, both of which reside in the same network switch. Further, the particular exemplary steps described above should not be viewed as limiting with respect to the present invention.

CONCLUSION

An exemplary embodiment of the present invention has been described above. Those skilled in the art will understand, however, that changes and modifications may be made to the embodiment described without departing from the true scope and spirit of the invention, which is defined by the claims.

We claim:

1. In a network switch that includes a first echo canceller and a second echo canceller comprising a first sub-component echo canceller and a second sub-component echo canceller, a method of cancelling echo, the method comprising:
adjusting the first echo canceller according to a test echo signal, the test echo signal being generated by a first echo path, the first echo path being located in the network switch;
receiving a signal comprising a first echo signal and a second echo signal, the first echo signal being generated by the first echo path, and the second echo signal being generated by a second echo path, the second echo path being located externally to the network switch;
cancelling the first echo signal with the first echo canceller;
adjusting the second echo canceller according to the second echo signal by concurrently applying each of the first and second sub-component echo cancellers to the second echo signal, outputting a first error signal from the first sub-component echo canceller and outputting a second error signal from the second sub-component echo canceller, and adjusting the second sub-component echo canceller to minimize the second error signal; and
cancelling the second echo signal with the second echo canceller.

2. The method of claim 1, wherein adjusting the first echo canceller comprises:
activating a communication link between the network switch and an external device;
removing from the communication link a connection-status signal, the connection-status signal being received at the network switch via the communication link;
transmitting a test signal from the network switch on the communication link;
receiving the test echo signal generated by the first echo path, the test echo signal corresponding to an echo of the transmitted test signal; and
adjusting the first echo canceller according to the test echo signal.

3. The method of claim 2, wherein the test signal is a noise signal, and wherein removing from the communication link the connection-status signal comprises transmitting from the network switch a cessation signal on the communication link.

4. The method of claim 2, wherein the test signal is a noise signal, and wherein removing from the communication link the connection-status signal comprises adjusting a removal filter according to the connection-status signal, the removal filter thereafter being operational to maximize the suppression in any input signal of any frequency components corresponding to frequency components of the connection-status signal.

5. The method of claim 4, further comprising:
applying the removal filter to the noise signal prior to transmitting the noise signal from the network switch on the communication link; and
applying the removal filter to the first echo signal prior to adjusting the first echo canceller according to the first echo signal.

6. The method of claim 2, wherein cancelling the first echo signal with the first echo canceller comprises cancelling a first echo of data transmissions, the data transmissions being sent from the network switch to an external device, and the first echo of the data transmissions being generated by the first echo path.

7. The method of claim 6, wherein cancelling the second echo signal with the second echo canceller comprises cancelling a second echo of the data transmissions, the second echo of the data transmissions being generated by the second echo path.

8. The method of claim 1, wherein the first echo path is associated with a two-wire-to-four-wire hybrid circuit in the network switch.

9. The method of claim 3, wherein the connection-status signal is dial tone and the cessation signal comprises at least one dual-tone multi-frequency tone, and wherein activating the communication link between the network switch and the external device comprises completing an analog-loop circuit between the network switch and the external device.

10. The method of claim 5, wherein the connection-status signal is dial tone, and wherein activating the communication link between the network switch and the external device comprises completing an analog-loop circuit between the network switch and the external device.

11. The method of claim 5, wherein the first echo canceller, the second echo canceller, and the removal filter all comprise components of a digital signal processing system, and wherein:
adjusting the first echo canceller according to the test echo signal further comprises determining a first set of coefficients for the first echo canceller according to a digital form of the test echo signal;
cancelling the first echo signal with the first echo canceller comprises cancelling a digital form of the first echo signal with the first echo canceller using the first set of coefficients;
adjusting the second echo canceller according to the second echo signal comprises determining a second set of coefficients for the second echo canceller according to a digital form of the second echo signal;
cancelling the second echo signal with the second echo canceller comprises cancelling a digital form of the first echo signal with the second echo canceller using the second set of coefficients;
adjusting the removal filter according to the connection-status signal comprises determining a third set of coefficients for the removal filter according to a digital form of the connection-status signal;
applying the removal filter to the test signal comprises applying the removal filter to a digital form of the test signal using the third set of coefficients; and
applying the removal filter to the first echo signal comprises applying the removal filter to a digital form of the first echo signal using the third set of coefficients.

12. The method of claim 1, wherein the first sub-component echo canceller corresponds to a previous adjustment of the second echo canceller and the second sub-component echo canceller corresponds to an initialized adjustment of the second echo canceller,
and wherein adjusting the second echo canceller further comprises:
determining the smaller of the first error signal and the second error signal;
outputting from the second echo canceller the smaller of the first error signal and the second error signal;
outputting from the second echo canceller only the second error signal after the second error signal is minimized; and
setting the first sub-component echo canceller to be the same as the second sub-component echo canceller.

13. The method of claim 12, wherein determining the smaller of the first error signal and the second error signal comprises determining the smaller of a first time average of the first error signal and a second time average of the second error signal, the first time average and the second time average each being determined in the same time interval.

14. The method of claim 13, wherein each of the first sub-component echo canceller and the second sub-component echo canceller comprise components of a digital signal processing system, and wherein:
concurrently applying each of the first and second sub-component echo cancellers to the second echo signal comprises applying the first sub-component echo canceller to a digital form of the second echo signal using a previous set of coefficients and applying the second sub-component echo canceller to a digital form of the second echo signal using an initialized set of coefficients;
determining the smaller of the first time average of the first error signal and the second time average of the second error signal further comprises determining the smaller of a first digital time average of a digital form the first error signal and a second digital time average of a digital form of the second error signal, the first digital time average and the second digital time average each being determined over the same digital time window;
adjusting the second sub-component echo canceller according to minimize the second error signal comprises determining a new set of coefficients for the second sub-component echo canceller according to a digital form of the second echo signal; and
setting the first sub-component echo canceller to be the same as the second sub-component echo canceller comprises setting the coefficients of the first sub-component echo canceller to be the same as the new set of coefficients.

15. A network switch comprising:
a first echo canceller;
a second echo canceller comprising a first sub-component echo canceller and a second sub-component echo canceller;
at least one processor for controlling operation of the first and second echo cancellers; and
machine-language instructions executable by the at least one processor to carry out functions including:
adjusting the first echo canceller according to a test echo signal, wherein the test echo signal is generated by a first echo path, and wherein the first echo path is located in the network switch,
receiving a signal comprising a first echo signal and a second echo signal, wherein the first echo signal is generated by the first echo path, the second echo signal is generated by a second echo path, and wherein the second echo path is located externally to the network switch,
cancelling the first echo signal with the first echo canceller,
adjusting the second echo canceller according to the second echo signal by concurrently applying each of the first and second sub-component echo cancellers to the second echo signal, outputting a first error signal from the first sub-component echo canceller and outputting a second error signal from the second sub-component echo canceller, and adjusting the second sub-component echo canceller to minimize the second error signal, and
cancelling the second echo signal with the second echo canceller.

* * * * *

UNITED STATES PATENT AND TRADEMARK OFFICE
CERTIFICATE OF CORRECTION

| | | |
|---|---|---|
| PATENT NO. | : 7,860,236 B2 | Page 1 of 1 |
| APPLICATION NO. | : 11/670316 | |
| DATED | : December 28, 2010 | |
| INVENTOR(S) | : Youhong Lu et al. | |

It is certified that error appears in the above-identified patent and that said Letters Patent is hereby corrected as shown below:

On the title page, in item (73), Assignee, in column 1, line 1, delete "Hewlet-Packard Company," and insert -- Hewlett-Packard Company, --, therefor.

Signed and Sealed this
Twenty-second Day of November, 2011

David J. Kappos
*Director of the United States Patent and Trademark Office*